(12) United States Patent
Kang et al.

(10) Patent No.: US 7,467,203 B2
(45) Date of Patent: Dec. 16, 2008

(54) SYSTEM AND METHODS FOR ROBUST DISCOVERY OF SERVERS AND SERVICES IN A HETEROGENEOUS ENVIRONMENT

(75) Inventors: Nina Kang, Seattle, WA (US); Jason Allor, Seattle, WA (US); Kenneth Van Hyning, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 10/679,931

(22) Filed: Oct. 6, 2003

(65) Prior Publication Data
US 2005/0086340 A1  Apr. 21, 2005

(51) Int. Cl.
G06F 15/173 (2006.01)
G06F 15/177 (2006.01)

(52) U.S. Cl. .............. 709/224; 709/223; 709/220; 709/227; 709/229; 370/328; 370/401

(58) Field of Classification Search ............. 709/224
See application file for complete search history.

(56) References Cited

U.S. PATENT DOCUMENTS

| | | | |
|---|---|---|---|
| 5,948,064 A | 9/1999 | Bertram et al. | |
| 5,953,012 A | 9/1999 | Veghte et al. | |
| 6,182,075 B1 | 1/2001 | Hsu | |
| 6,246,409 B1 | 6/2001 | Veghte et al. | |
| 6,418,466 B1 | 7/2002 | Bertram et al. | |
| 6,483,812 B1 | 11/2002 | Prorock | |
| 6,549,932 B1 | 4/2003 | McNally et al. | |
| 7,124,188 B2 * | 10/2006 | Mangipudi et al. | 709/226 |
| 2001/0051981 A1 | 12/2001 | Davison et al. | |
| 2002/0099814 A1 | 7/2002 | Mastrianni | |
| 2003/0061339 A1 | 3/2003 | Benfield et al. | |
| 2003/0065762 A1 * | 4/2003 | Stolorz et al. | 709/223 |
| 2003/0135613 A1 * | 7/2003 | Yoshida et al. | 709/224 |
| 2003/0177174 A1 * | 9/2003 | Allen et al. | 709/203 |
| 2004/0249974 A1 * | 12/2004 | Alkhatib et al. | 709/245 |

OTHER PUBLICATIONS

Bhagwat, Pravin; Perkins, Charles E.; Tripathi Satish K.; Transparent Resource Discovery for Mobile Computers, Proceedings of the Workshop on Mobile Computing Systems and Applications, 1995, p. 116-118, IEEE Computer Society Press, Los Alamitos, CA.

(Continued)

Primary Examiner—Jude J Jean Gilles
(74) Attorney, Agent, or Firm—Christensen O'Connor Johnson Kindness PLLC

(57) ABSTRACT

The present invention is contained in a system for facilitating the identification, discovery, and monitoring of servers and services within a distributed network. The present invention is a system for dynamically discovering all of the servers and services on a network. The dynamic discovery of servers includes first enumerating all of the domains within a network and second enumerating all of the known servers in each of the discovered domains. Next, the system acquires and stores additional server contact information necessary to robustly connect to the server. Finally, the system determines the role of a server in a specified domain within a network. The system will continually monitor the connections to the servers and may use the server contact information to connect to a server or service when a network failure occurs.

42 Claims, 14 Drawing Sheets

OTHER PUBLICATIONS

Guttman, Erik, Service Location Protocol: Automatic Discovery of IP Network Services, IEEE Internet Computing, Jul./Aug. 1999, p. 71-80, vol. 3, No. 4, IEEE, USA.

Xu, Dongyan; Nahrstedt, Klara; Wichadakul, Duangdao; QoS-Aware Discovery of Wide-Area Distributed Services, Proceedings First IEEE/ACM International Symposium on Cluster Computing and the Grid, 2001, p. 92-99, IEEE Comput. Soc, Los Alamitos, CA.

Guo, Meng; Ammar, Mostafa H.; Zegura, Ellen W.; Hao, Fang; A Probe-Based Server Selection Protocol for Differentiated Service Networks, 2002 IEEE International Conference on Communications, Conference Proceedings, 2002, p. 2353-2357, vol. 4, IEEE, Piscataway, NJ.

Bram, Robert; Dospisil, Jana; Intelligent Service Discovery, Issues and Trends of Information Technology Management in Contemporary Organizations, 2002 Information Resources Management Association International Conference, 2002, p. 87-90, vol. 1, Idea Group Publishing, Hershey, PA.

* cited by examiner

SYSTEM AND METHODS FOR ROBUST DISCOVERY OF SERVERS AND SERVICES IN A HETEROGENEOUS ENVIRONMENT

TECHNICAL FIELD

The present invention generally relates to systems and methods for identifying and discovering servers and services within a heterogeneous environment, and, more particularly, to the systems and methods for identifying and discovering servers and services within a heterogeneous environment that acquire server and service identification information through appropriate inquiry.

BACKGROUND OF THE INVENTION

Networking systems distribute tasks and services over a variety of communication devices, such as computer systems or servers. Many companies own and manage servers to provide employees and/or consumers with a variety of services including electronic mail (e-mail), file-sharing, printer access, web pages, media streaming, and the like. Indeed, servers may be utilized for multiple purposes and include, but are not limited to, domain controllers, dynamic host configuration protocol (DHCP) servers, domain name service (DNS) servers, application servers, file servers, internet information servers (IIS), mail servers, print servers, remote access servers (RAS), structured query language (SQL) servers, terminal or telnet servers, "WINDOWS® INTERNET NAMING SERVICE" (WINS) servers, audio/video or media servers, chat servers, internet relay chat (IRC) servers, fax servers, file transfer protocol (FTP) servers, groupware servers, list servers, news servers, proxy servers, portal servers, and web servers. Servers, such as those specified above, must constantly be monitored and maintained to prevent disruptions in provided services.

The monitoring of servers and other systems typically necessitates the use of software that entails manual customization, which can be both expensive and time consuming to implement and maintain. Implementing software for monitoring servers and services within a distributed network requires a user to manually provide specific information about each server or service within a domain of the network. Manually providing information to the monitoring software may be time-intensive and require a technologically knowledgeable user. Companies often have information technology (IT) personnel dedicated to managing and maintaining large-scale server deployments. Unfortunately, smaller businesses may lack the financial means to implement a full-scale management solution to adequately monitor servers and services.

Alternatively, the monitoring software may acquire specific information from a network directory, such as active directory, which contains specific information such as the device object type, the operating system associated with a device, the domain associated with a device, and the like. The specific information provided by the network directory, however, may be incomplete or represent data entered manually by a user. For example, a server may be generically labeled within the network directory as a computer, without indicating the server type. Without knowing the function of a server, the monitoring software may not adequately detect whether the server is working properly and may lead to more serious problems, such as network failure.

Accordingly, there is a need in the art for a system and methods for monitoring servers and services at a low cost to the user. There is also a need in the art for a system and methods for monitoring servers and services that require little technological knowledge about server configuration within a network or domain.

Additionally, there is a need in the art for a system and methods for discovering servers within a network or domain.

Further, there is a need in the art for a system and methods for identifying the roles of the servers within a network or domain.

SUMMARY OF THE INVENTION

Generally described, the present invention is contained in a system for facilitating the identification, discovery, and monitoring of servers and services within a distributed network. More particularly, the present invention is a system for dynamically discovering all of the servers and services on a network. The dynamic discovery of servers includes first enumerating all of the domains within a network and second enumerating all of the known servers in each of the discovered domains. Next, the system acquires and stores additional server contact information necessary to robustly connect to the server. Finally, the system determines the role of a server in a specified domain within a network. The system will continually monitor the connections to the servers and may use the server contact information to connect to a server or service when a network failure occurs.

Advantageously, the present invention provides for discovering, identifying, and monitoring servers or services within a network in a more automatic and cost efficient manner. A monitoring system in accordance with the present invention can robustly discover the servers on domains within a network and the roles or services each of the servers provide with little to no manual configuration. Additionally, the monitoring system may collect contact information for each server, so that in the event of a network failure or when the network is not running optimally, the monitoring system will have a series of redundant ways for contacting the server and ensuring that the server is working properly. If the monitoring system receives incomplete contact information from network resources, the monitoring system may automatically collect the missing information by querying a DNS server or a network basic input/output system (NetBIOS) server. The DNS server or NetBIOS server will respond by providing the appropriate contact information back to the monitoring system. The monitoring system may also determine the role of a server, when the network resources do not specify a role. The monitoring system may determine the role of the server by making systematic inquiries to the server, receiving responses to the systematic inquires, and analyzing the responses received from the server.

Other features and advantages of the present invention will become apparent upon reading and understanding the present specification when taken in conjunction with the appended drawings.

DETAILED DESCRIPTION OF THE INVENTION

Figure 1:
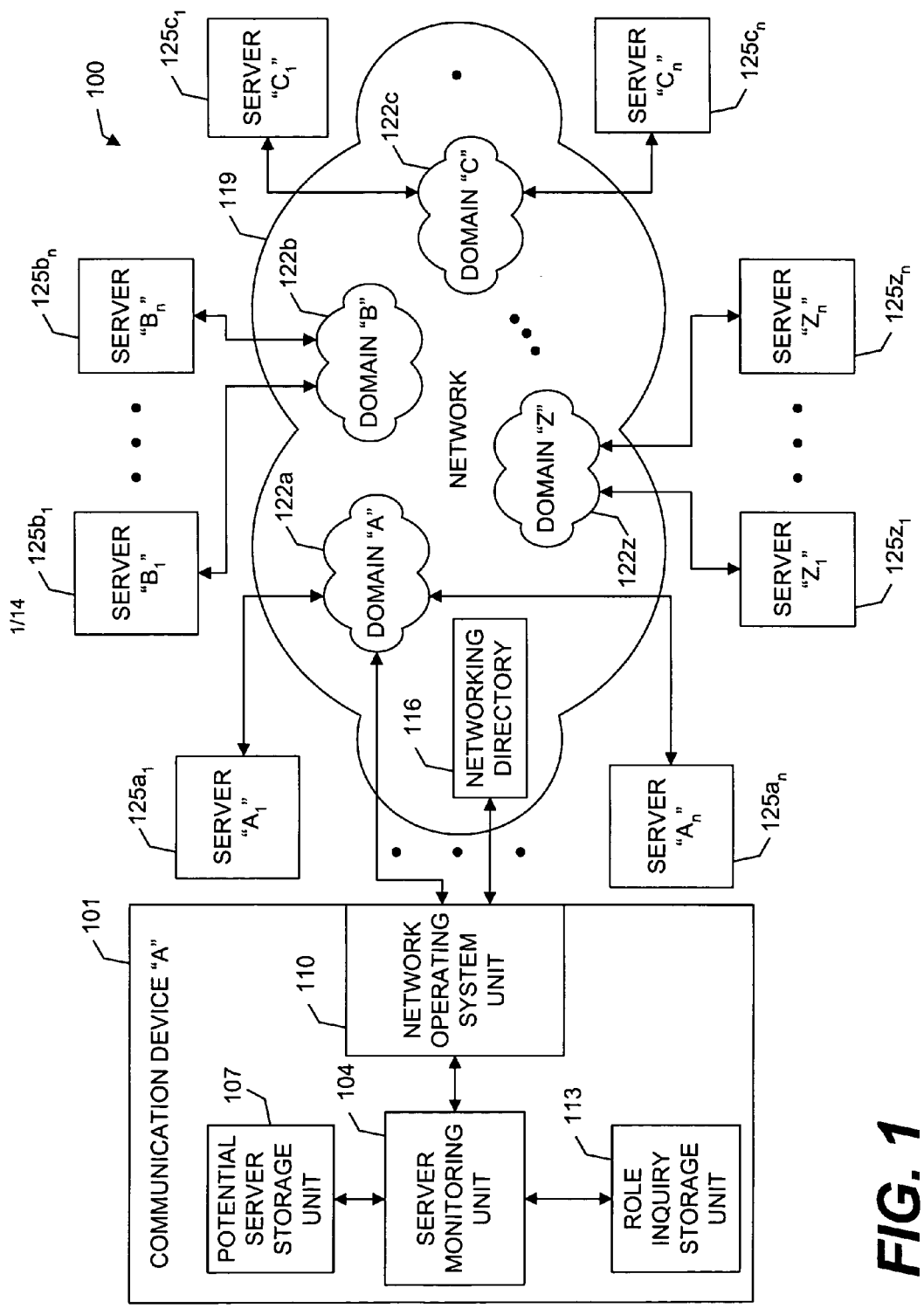
FIG. 1 displays a block diagram representation of a network environment for monitoring servers and services over a distributed network in accordance with the present invention.

Referring now to the drawings, in which like numerals represent like components or steps throughout the several views, FIG. 1 displays a block diagram representation of a network environment 100 for monitoring servers and services over a distributed network in accordance with the present invention. The network environment 100 comprises a communication device 101 connected to a network 119. The communication device 101 includes a server monitoring unit 104, a role inquiry storage unit 113, a potential server storage unit 107, and a network operating system unit 110. The network 119 comprises a networking directory 116 and at least one domain 122 with at least one server 125 connected to the domain 122. The number of domains 122 within a network 119 may vary depending upon the configuration of the network 119. Therefore, the network 119 may comprise between one and "z" domains, as illustrated in FIG. 1. Similarly, the number of servers 125 connected to the domain 122 may also vary depending on the number of servers deployed within the domain 122 configuration. Each domain 122, therefore, may contain between one and "n" servers 125, as illustrated in FIG. 1.

One skilled in the art will recognize that a network 119 typically comprises the infrastructure and facilities appropriate to connect a group of two or more communication devices 101 (including, without limitation, a plurality of servers 125 or client devices). Such a network 119, communication device 101, and servers 125 may be configured in multiple topologies including, but not limited to, star, bus, or ring configurations. Also, a network 119, communication device 101, and servers 125 may be broadly categorized as belonging to a particular architecture including, but not limited to, peer-to-peer or client/server architectures. The network 119 may additionally be classified by the geographical location of the communication devices 101 or servers 125 and the types thereof. For example, a network 119 connecting a plurality of computer systems or servers 125 located proximate to each other, such as within a building, is referred to as a local-area network (LAN); if the computer systems are located farther apart, the network 119 is generally referred to as a wide-area network (WAN), such as the Internet; if the computer systems are located within a limited geographical area, such as a university campus or military establishment, the network 119 is referred to as a campus-area network (CAN); if the computer systems are connected together within a city or town, the network 119 is referred to as a metropolitan-area network (MAN); and if the computer systems are connected together within a user's home, the network 119 is referred to as a home-area network (HAN).

Also, one skilled in the art will recognize that the domains 122a, 122b, 122c, and 122z comprise a collection of computer systems and/or servers 125 that share a common domain database and security policy. Each domain 122a, 122b, 122c, and 122z, typically, has a unique name within the network 119. Additionally, the domains 122a, 122b, 122c, and 122z may share or overlap with reference to resources and services. A domain 122 may be connected to other domains 122 within the network 119. Additionally, a domain 122a may have a trust relationship with other domains 122b, 122c, and 122z to facilitate pass-through authentication. Trust relationships between domains 122 establish such pass-through authentication by honoring the logon authentications of a trusted domain 122b by a trusting domain 122a. Also, user accounts and global groups defined in one domain 122b (i.e., a trusted domain) may be given access and permissions within another domain 122a (i.e., a trusting domain), even though the user accounts and global groups do not exist within the domain 122a (i.e., trusting domain).

The servers 125 and communication devices 101 provide resources or services within each domain 122. Servers 125 and communication devices 101 may include, but are not limited to, a desktop computer, laptop computer, mobile computer, server computer, wireless phone, personal digital assistant (PDA), and any other device capable of communicating with another server 125 or communication device 101. In an exemplary embodiment of the present invention, the servers 125 and communication devices 101 are similar to the computer system 210 described below with reference to FIG. 2. Servers 125 vary in function and configuration and include, but are not limited to, domain controllers, DHCP servers, DNS servers, application servers, file servers, IISs, mail servers, print servers, RASs, SQL servers, terminal or telnet servers, WINS servers, audio/video or media servers, chat servers, IRC servers, fax servers, FTP servers, groupware servers, list servers, news servers, proxy servers, portal servers, and web servers.

In an exemplary embodiment of the present invention, the communication device 101 discovers, identifies, and monitors servers 125 and services within a network 119 or group of at least one domain 122. A server monitoring unit 104 of the communication device 101 connects to a potential server storage unit 107, role inquiry storage unit 113, and network operating system unit 110. The server monitoring unit 104 is configured with hardware and software appropriate to perform tasks and provide capabilities and functionality as described herein. The server monitoring unit 104 assists in the discovering, identifying, and monitoring of servers 125 and services within the network 119 or domain 122.

The potential server storage unit 107 provides the server monitoring unit 104 with potential server data used for the discovering, identifying, and monitoring of servers 125 and their associated services. Potential server data comprises a list of devices, such as computer systems, servers, printers, and the like, known to be within a certain domain 122 of the network 119. Depending on the information available about each device, the potential server data may identify a particular device, identify the device's location, and identify the device's role or function. Additionally, the potential server data may comprise a list of domains 122 enumerated during domain 122 discovery. The server monitoring unit 104 provides the potential server storage unit 107 with additional data about each device discovered during an examination of the domains 122a, 122b, 122c, and 122z. Thus, at any given time, the potential server data may comprise complete or incomplete information about a certain device within a given domain 122 within the network 119.

The potential server storage unit 107 is a memory device capable of storing and retrieving data including, but not limited to, random access memory (RAM), flash memory, magnetic memory devices, optical memory devices, hard disk drives, removable volatile or non-volatile memory devices, optical storage mediums, magnetic storage mediums, or RAM memory cards. Alternatively, the potential server storage unit 107 may be a remote storage facility accessible through a wired and/or wireless network system. Additionally, the potential server storage unit 107 may be a memory system comprising a multi-stage system of primary and secondary memory devices, as described above. The primary memory device and secondary memory device may operate as a cache for the other or the second memory device may serve as a backup to the primary memory device. In yet another example, the potential server storage unit 107 may be a memory device configured as a simple database file or as a searchable, relational database using a query language, such as SQL.

The role inquiry storage unit 113 provides the server monitoring unit 104 with role inquiry data for identifying and monitoring servers 125 and services within a network 119 or domain 122. Role inquiry data comprises information requests or sets of information requests used for systematically determining the role of a device based upon the device's response to the information requests. Additionally, role inquiry data may be structured into categories and subcategories where certain information requests relate to the determination of certain servers 125 or services. A response from a device to information requests may trigger additional information requests to further probe the role of the device. Role inquiry data comprises not only the information requests necessary to determine the role of a device, but also information requests necessary to monitor the device after the role has been determined. For example, if a device has been identified as a printer server, additional information requests may be made to determine the printer ports, documents within the print queue, default spool directory, or amount of disk space available for the spool directory. The role inquiry storage unit 113 is a memory device capable of storing and retrieving data similar to the memory devices described above with reference to the potential server storage unit 107.

The networking directory 116 provides information about identified resources on a network 119 or domain 122 to the server monitoring unit 104 via the network operating system unit 110. As a network service, the networking directory 116, typically, identifies all of the available resources on a network 119 or domain 122 and ensures that the resources are accessible to appropriate users and applications. The networking directory 116 may acquire the identity of all the available resources on a network 119 through manual user input or automatic detection. The networking directory 116 generally conceals the network topology and the network protocols from the user, thus allowing a user to communicate with any service or resource without knowing how the service or resource is physically connected to the network 119. Each resource identified in the network directory 116 may have an object code that categorizes the resource within the network 119 (i.e., a client computer connected to the network 119 may be categorized as a computer by the object code). The information provided by the networking directory 116 to the server monitoring unit 104 may be incomplete and, therefore, may require additional data for determining the role or function of a server 125. One skilled in the art will recognize that the networking directory 116 may be a server 125 on a network 119 and may function similar to applications such as "ACTIVE DIRECTORY®" available from Microsoft Corporation of Redmond, Wash.

The network operating system unit 110 connects to the network 119 and the domains 122 therein and provides the functionality for the communication device 101 to request and receive information from a remote computer or server 125 through a network interface 270. Generally, the network operating system unit 110 includes program modules that provide special functions for connecting communication devices 101 to the network 119. The network operating system unit 110, for example, implements protocol stacks and device drivers for networking hardware. The network operating system unit 110 may comprise a memory device as described above with reference to the potential server storage unit 107. When requesting additional information to fulfill the remainder of a server's 125 contact information, the server monitoring unit 104 uses the program modules available through the network operating system unit 110 to communicate over the network 119 to the remote computer. A response from the remote computer is received by the communication device 101 through the network operating system unit 110 where it is provided to the server monitoring unit 104 for evaluation. Additionally, the server monitoring unit 104 uses the program modules available through the network operating system unit 110 to communicate over the network 119 to the networking directory 116.

One skilled in the art will recognize that a connection may include or require any appropriate type of connection for the bi-directional communication of signals and/or media including, but not limited to, analog, digital, wired and wireless communication channels. Such communication channels may utilize, but not be limited to, copper wire, optical fiber, radio frequency, infrared, satellite, or other facilities and media.

Figure 2:
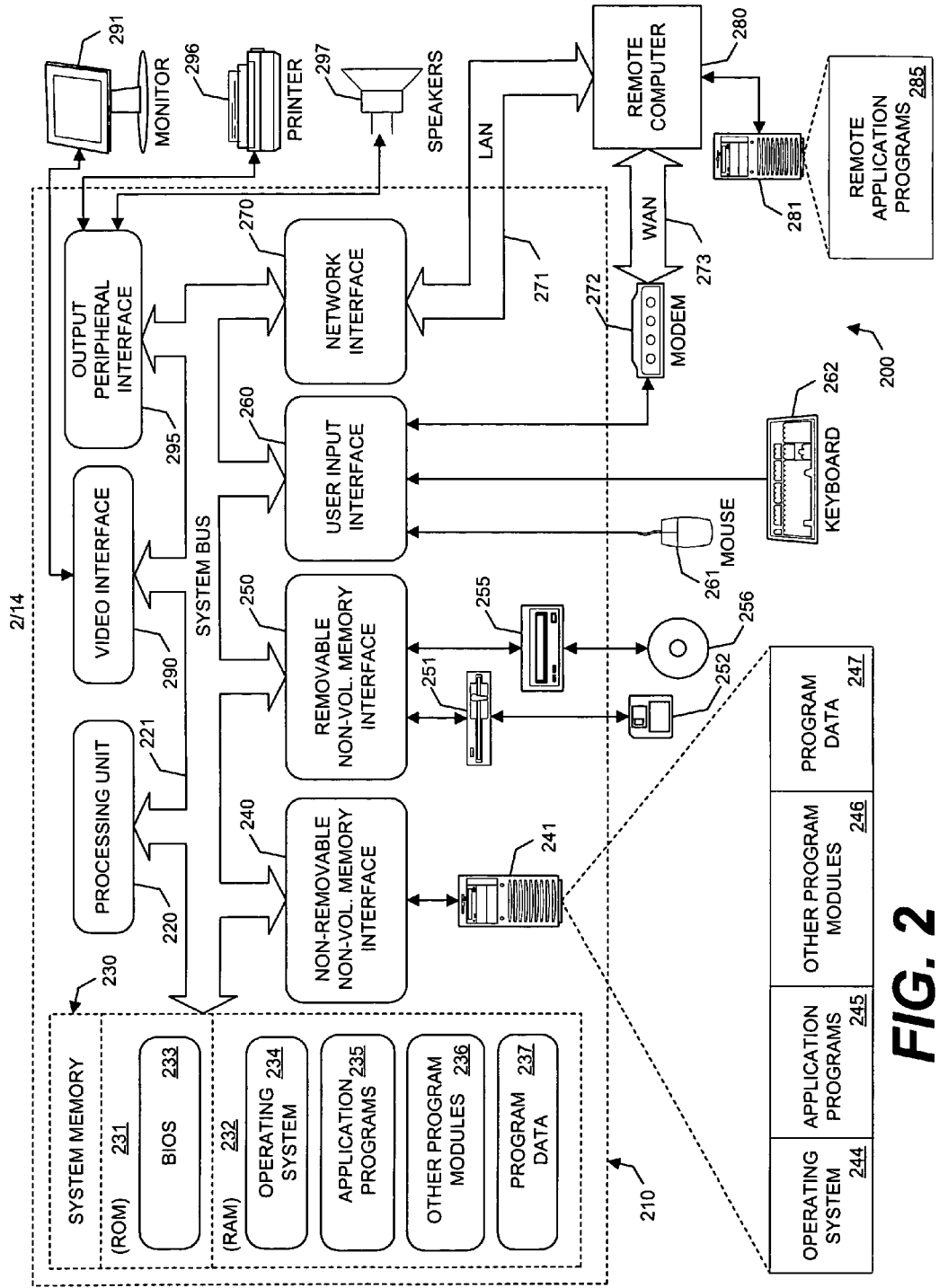
FIG. 2 displays a block diagram illustrating a computer environment for detecting and monitoring servers and services over a distributed network in accordance with the present invention.

FIG. 2 displays a block diagram illustrating a computer environment 200 for detecting and monitoring servers and services over a distributed network in accordance with the present invention. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, or data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 210. Components of computer 210 may include, but are not limited to, a processing unit 220, a system memory 230, and a system bus 221 that couples various system components including the system memory 230 to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281.

It will be appreciated that the network connections shown are exemplary and other means of establishing a communications link between the computers may be used.

Figure 3:
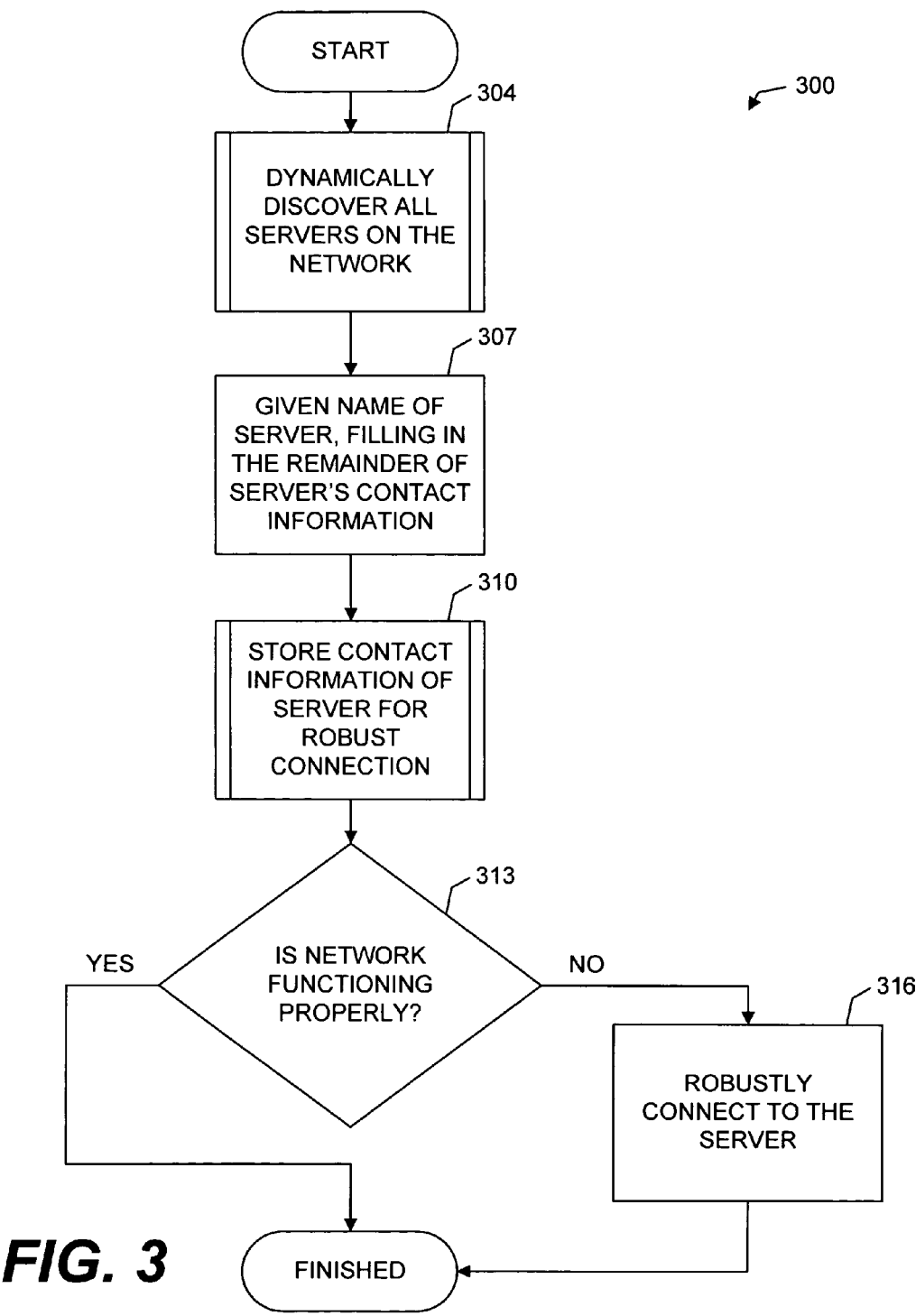
FIG. 3 displays a logic flow diagram illustrating a routine for dynamically discovering and monitoring servers on the network in accordance with the present invention.

FIG. 3 displays a logic flow diagram illustrating a routine 300 for dynamically discovering and monitoring servers 125 on the network 119 in accordance with the present invention. Monitoring the network 119 of services requires knowing what services are available within the network 119. The present invention provides the framework for discovering servers 125 connected to a network 119 and for identifying various services provided by the servers 125. Such a framework is important in small server 125 deployments, because smaller businesses often cannot afford the costs of information technology (IT) staff or more expensive monitoring systems. The present invention enumerates all of the domains 122 within a target network 119 and then enumerates all of the servers 125 associated with the identified domains 122. Additionally, the present invention completes server 125 identification information (i.e., the server's 125 role) and monitors server 125 failover.

Routine 300 begins at 304, in which the communication device 101 dynamically discovers all the servers 125 on the network 119. The communication device 101 dynamically discovers all of the servers 125 first by enumerating all of the known domains 122 within the network 119 and second by enumerating all of the known servers 125 within each known domain 122. Enumerating the domains 122 and the servers 125 is discussed in more detail below with reference to FIGS. 4A-4B. The user then identifies a particular server 125 on the network 119 to monitor.

At 307, the communication device 101 retrieves the contact information of the server 125 the user wants to monitor. Typically, a user may manually designate a server 125 to monitor by providing a server identifier name, such as the server's network basic input/output system (NetBIOS) name or the server's fully qualified domain name (FQDN), and, optionally, domain 122 information. One skilled in the art will recognize that input from a user may be acquired by means of a user interface. Using a variety of application program interfaces (APIs), additional information may be acquired about the server 125 including, but not limited to, the NetBIOS name, the FQDN, and the domain 122 associated with the server 125. Filling in the remainder of a server's 125 contact information is discussed in more detail below with reference to FIGS. 5A-5D.

At 310 the communication device 101 stores the contact information of a server 125 for robustly connecting to the server 125 in the event of an occurrence of a network failure situation. The contact information necessary for robustly connecting to the server 125 includes, but is not limited to, the machine name of the server 125 (i.e., NetBIOS name), the FQDN of the server 125 for DNS enabled networks, the domain 122, and the last known valid internet protocol (IP) address. Such contact information provides redundant methods to communicate with a server 125 during periods when the network 119 is not functioning properly. Storing the contact information of a server 125 for robustly connecting to the server 125 is described in more detail below in FIGS. 6A-6C.

The communication device 101, at 313, then determines whether the network 119 is functioning properly. A network 119 may not function properly for a variety of reasons. For example, one reason that the network 119 may not function properly is that the server's FQDN may not properly resolve because the DNS server may have crashed. Another reason may be that problems exist in the NetBIOS layer, thus, preventing NetBIOS traffic within the network 119. In this circumstance, the NetBIOS name may not resolve properly; and connecting to a server 125 by IP address may be unsuccessful if a reverse DNS lookup is not available. Although only two examples of why the network 119 may not be functioning properly have been described, those skilled in the art will appreciate that there are other circumstances that may occur, which will cause the network to function improperly. If the communication device 101 determines that the network 119 is functioning properly, then routine 300 follows the "YES" branch to the "FINISHED" block, where routine 300 ends the operation.

If, however, the communication device 101 determines at 313 that the network is not functioning properly, then the communication device 101, at 316, robustly connects to the server 125 currently being monitored. For connecting to the server 125, the communication device 101 first determines the best method to connect to the server 125. The communication device 101 provides the network operating system unit 110 with the NetBIOS name, the FQDN, or a valid IP address of the server 125. The network operating system unit 110, through various networking APIs, authenticates and makes the connection to the server 125. Robustly connecting to the server 125 being monitored is described below in greater detail with reference to FIGS. 6A-6C.

Figure 4A:
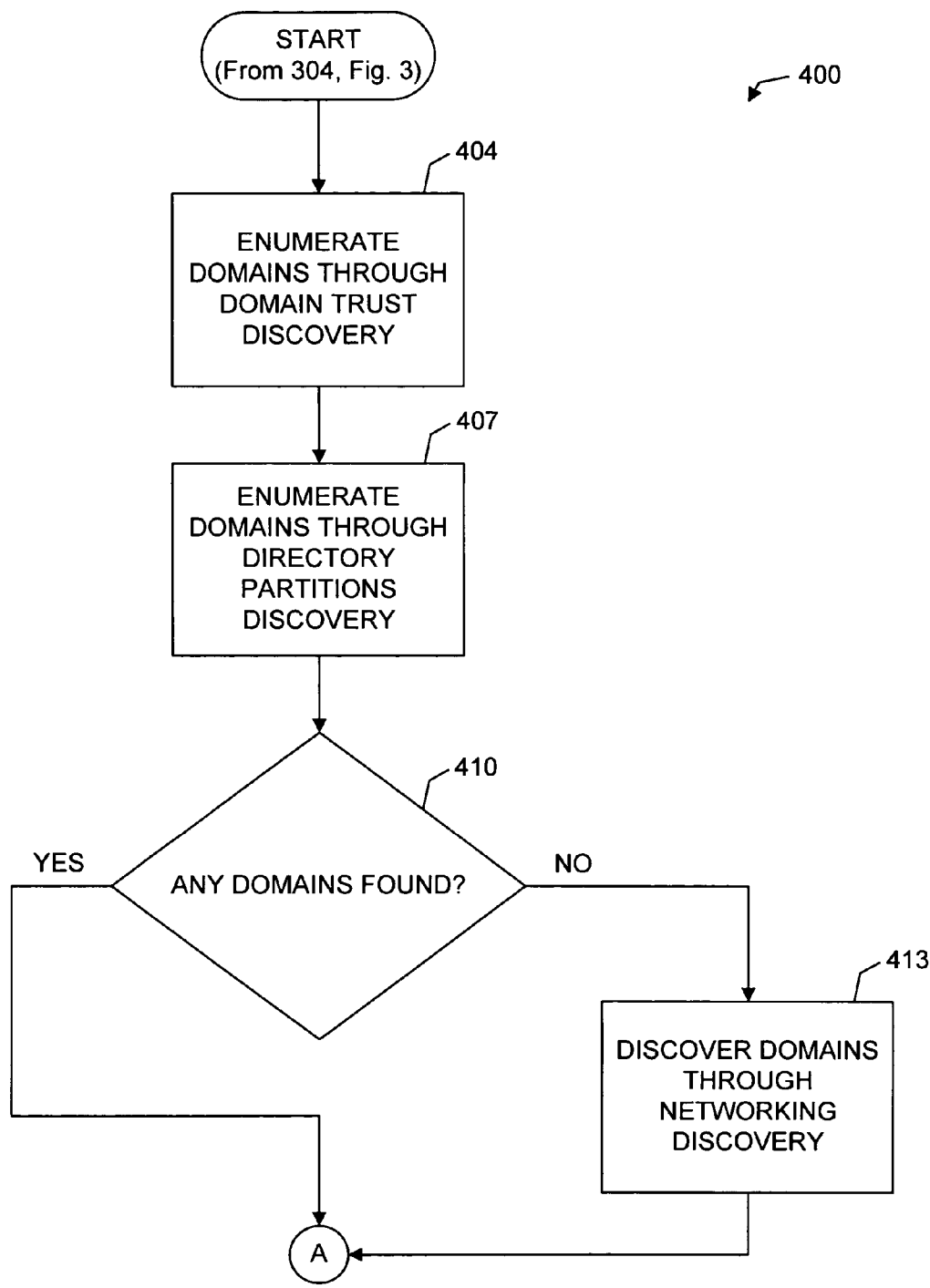
FIGS. 4A-4B, collectively known as FIG. 4, display a logic flow diagram illustrating a routine for discovering domains and servers over a distributed network.
Figure 4B:
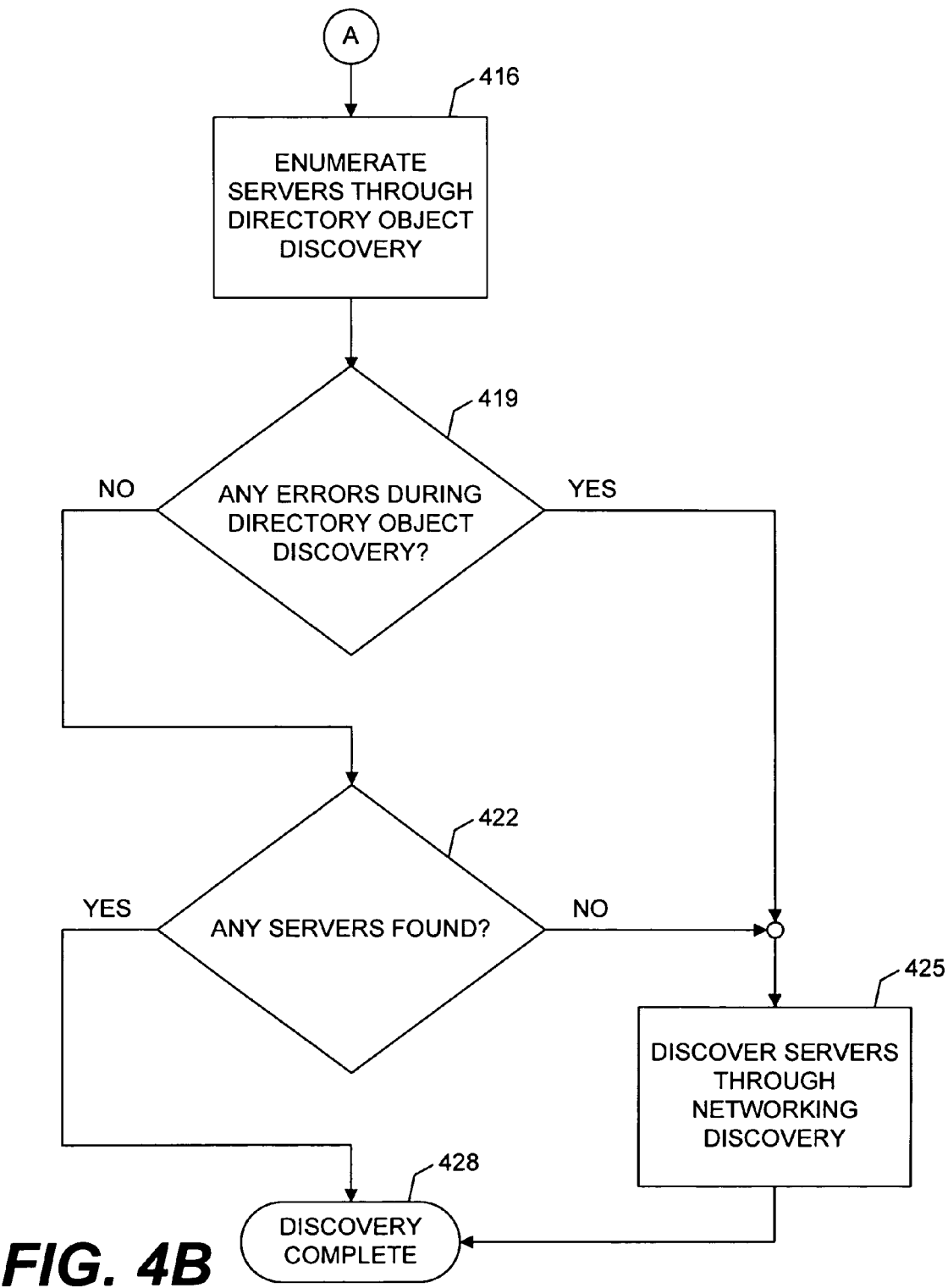
Figure 5A:
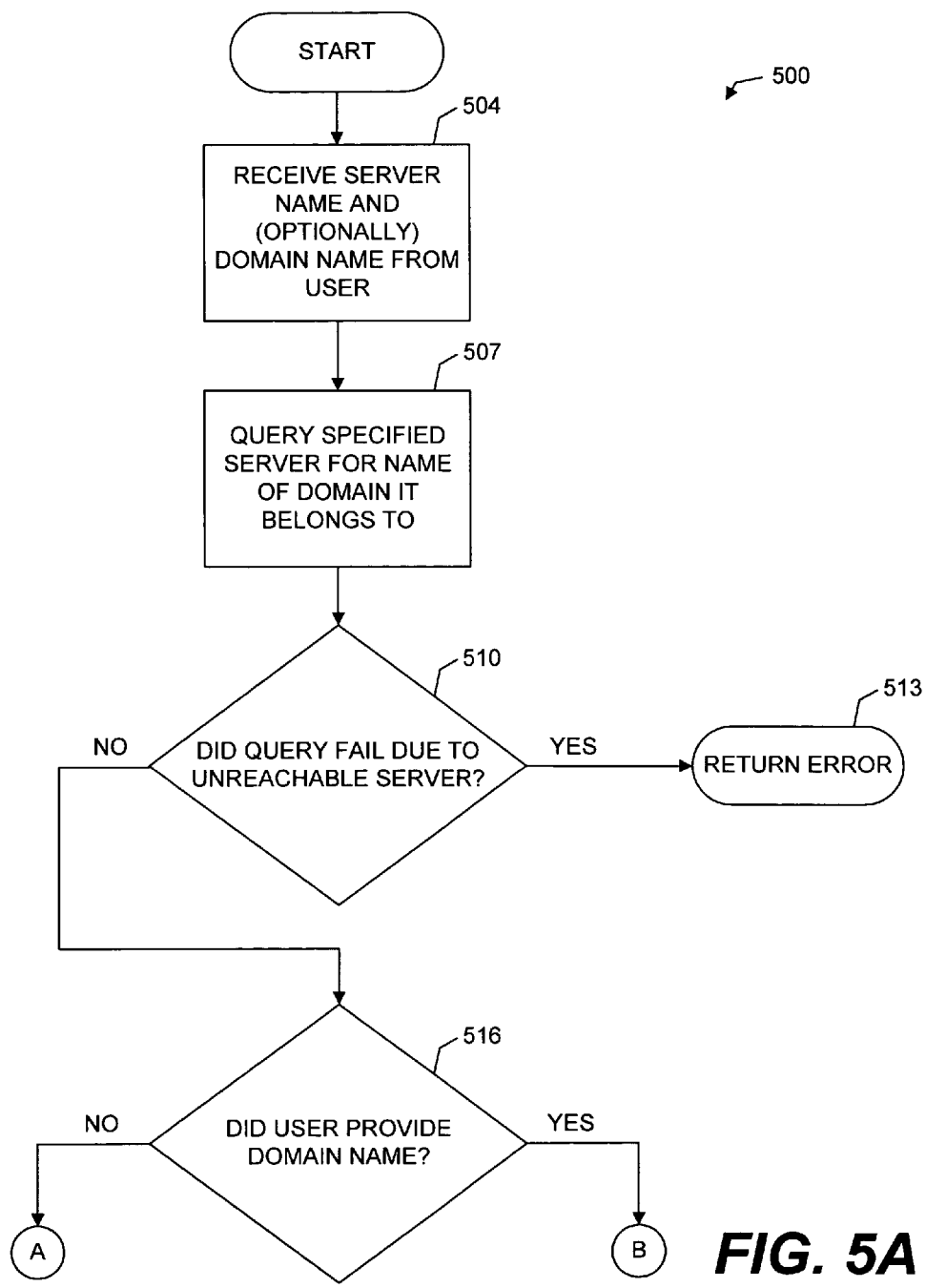
FIGS. 5A-5D, collectively known as FIG. 5, display a logic flow diagram illustrating a routine for acquiring additional server identification information for a known server residing in a known domain over a distributed network.
Figure 5B:
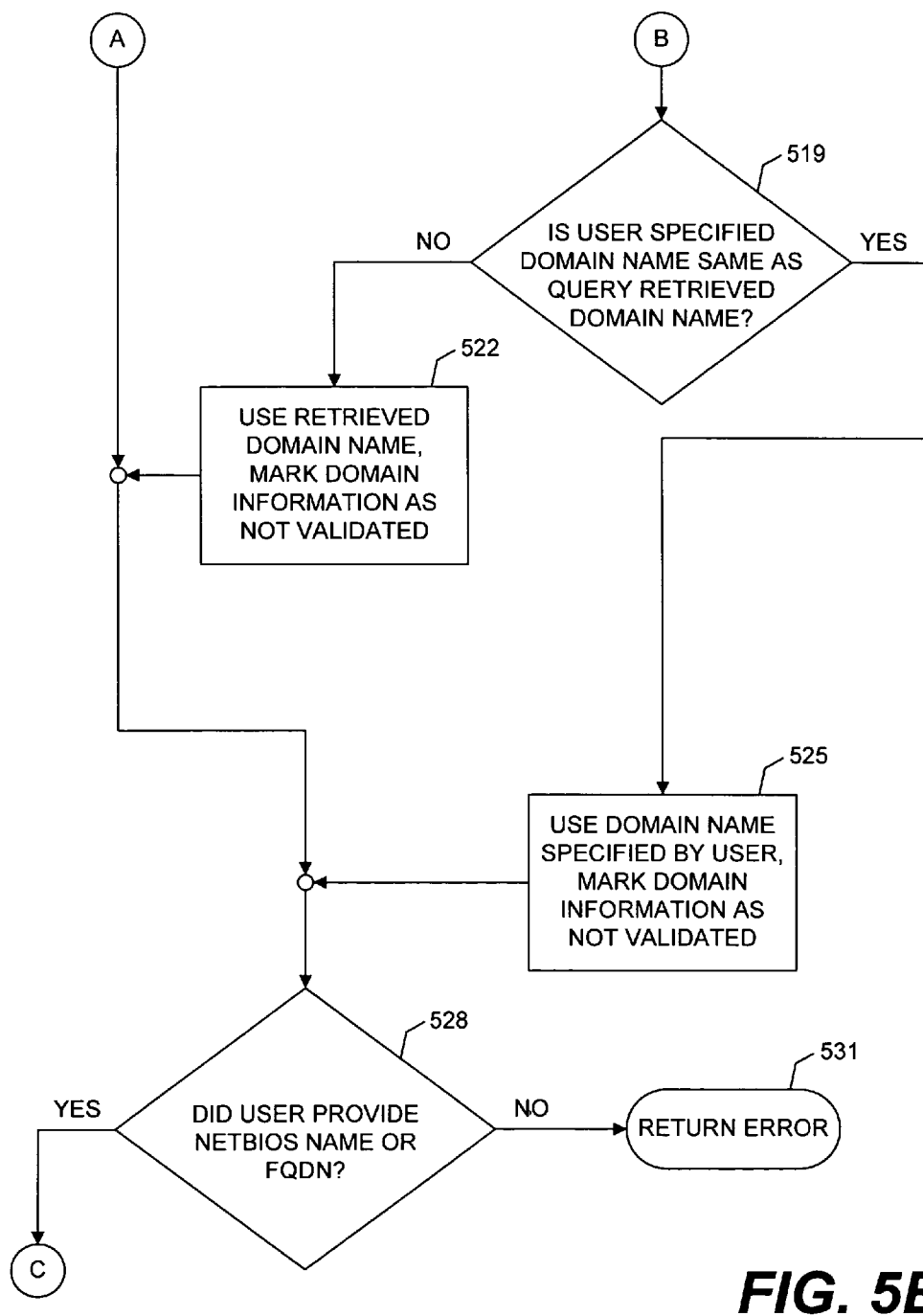
Figure 5C:
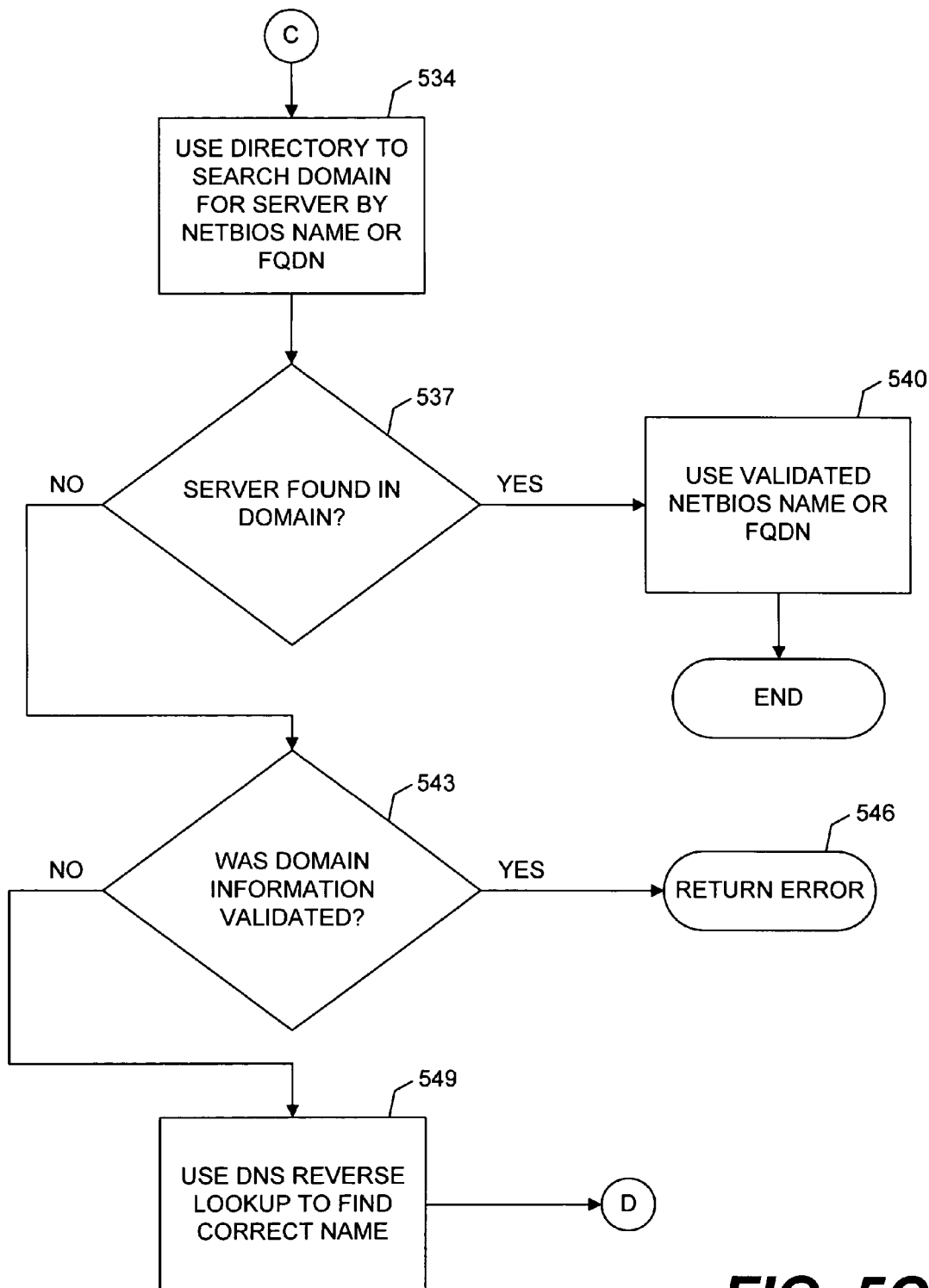
Figure 5D:
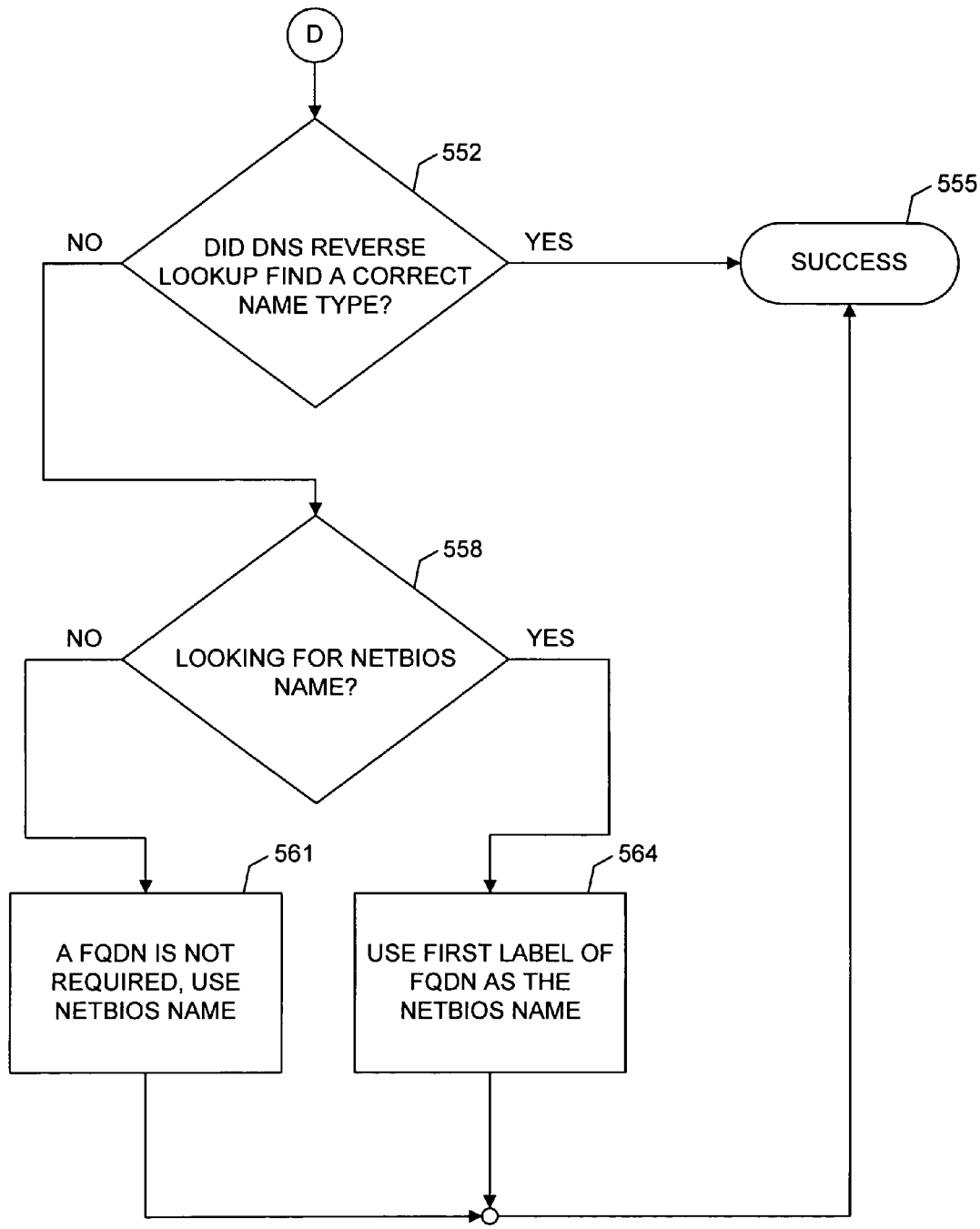

FIGS. 4A-4B, collectively known as FIG. 4, display a logic flow diagram illustrating a routine 400 from 304 (FIG. 3) for discovering domains 122 and servers 125 over a distributed network 119. In order to find servers 125 on the network 119, the present invention enumerates the domains 122 within the network 119. Such domain 122 enumeration typically includes domain trust discovery, networking directory partition discovery, and, if necessary, networking discovery. After finding the domains 122 within the network 119, each server 125 within each discovered domain 122 is enumerated.

Routine 400 begins at 404, where the server monitoring unit 104, and hence the communication device 101, enumerates domains 122 through domain trust discovery. With a properly enabled networking directory 116, the server monitoring unit 104, through the network operating system unit 110, queries a remote server 125 for a list of domains 122 that have trust relationships with the server's 125 domain 122. The server monitoring unit 104 may use networking program modules to find all domains 122 that directly trust the domain 122 of the remote server 125. The server monitoring unit 104 may also find all domains 122 that the remote server's 125 domain 122 directly trusts, find all domains 122 that are within the same forest of domains 122 as the remote server 125 domain 122, find all domains 122 that are the primary domain 122 of the remote server 125 domain 122, and find all domains 122 that are the root of a tree and a member of the same forest of domains 122 as the remote server 125 domain 122. Typically, the server monitoring unit 104 queries a DNS server for each network adapter on the local communication device 101 to acquire the list of domains 122, but if two or more network adapters share the same DNS server, then the server monitoring unit 104 only queries the DNS server once. The server monitoring unit 104 provides the retrieved list of domains 122 to the potential server storage unit 107 for storage.

Next, at 407 the server monitoring unit 104 enumerates domains 122 through networking directory partitions discovery. Generally, the networking directory 116 stores a list of domains associated with the local communication device 101 within a partitions container. The server monitoring unit 104 receives a list of any domains 122 within the partitions container from the networking directory 116, via the network operating system unit 110.

Once the all the domains 122 are enumerated, the server monitoring unit 104 determines whether any domains 122 were enumerated during domain discovery at 410. The server monitoring unit 104 checks the potential server storage unit 107 to evaluate whether any domains 122 were found. If domains 122 were successfully enumerated during discovery, the server monitoring unit 104 proceeds to 416, described below.

If, however, at 410 the server monitoring unit 104 determines that no domains 122 were enumerated during discovery, then the server monitoring unit 104 proceeds to 413 where the server monitoring unit 104 locates all of the domains 122 within the network 119 using the network operating system unit 110. A list of domains 122 typically resides on servers 125, such as a "WINDOWS® INTERNET NAMING SERVICE" server available from Microsoft Corporation of Redmond, Wash., that operate an application program for determining the IP address associated with a network computer (i.e., also known as "name resolution"). The server monitoring unit 104, using various APIs provided by the network operating system unit 110, may query the WINS server for known domains 122. At this point the domain discovery is complete and the server monitoring unit 104 proceeds to 416, described below. Discovering domains 122 through the network 119 is efficient, however, the domain discovery through the network 119 may provide incomplete lists of domains 122, may provide nondeterministic results, and typically must rely on an ever changing list of domains 122, as domains 122 are constantly being added and removed from the network 119. Therefore, the present invention only uses the network 119 to discover domains 122 when no domains 122 are enumerated from either the trust discovery or networking directory partitions discovery methods.

At step 416, the server monitoring unit 104, and hence the communication device 101, enumerates servers 125 through object discovery of the networking directory 116. The networking directory 116 comprises information about devices connected to the network 119. The devices are stored as objects in the networking directory 116 and may have different attributes associated with the object. With a properly enabled networking directory 116, the server monitoring unit 104 searches, via the network operating system unit 110, every object listed in the networking directory 116 for any object categorized as a "computer". This insures that all relevant objects attached to the network 119 are discovered. However, any objects indicating an associated operating system are ignored if the operating system refers to a workstation operating system. The server monitoring unit 104 provides the acquired list of objects categorized as "computer" to the potential server storage unit 107 for storage.

Next, at 419, the server monitoring unit 104 determines whether any errors occurred during the networking directory object discovery. For example, errors may have occurred while accessing the networking directory 116. If, at 419, the server monitoring unit 104 determines that an error did occur, then the "YES" branch is followed to 425, where the server monitoring unit 104 discovers servers 125 within the network via the network operating system unit 110. The server monitoring unit 104, using appropriate networking APIs, searches the WINS server to acquire a list of known servers 125. The server monitoring unit 104 then ends operation at 428. If, however, the server monitoring unit 104 determines, at 419, that no errors occurred during networking directory object discovery, then the server monitoring unit 104 proceeds to 422 where the server monitoring unit 104 determines whether any servers 125 were discovered during the networking directory object discovery. If the server monitoring unit 104 determines that the list of servers 125 is not empty, then the server monitoring unit 104 terminates operation in accordance with routine 400 at 428. Otherwise, if the server monitoring unit 104 determines that no servers 125 were discovered during networking directory object discovery, then the server monitoring unit 104 proceeds to 425, discussed above.

FIGS. 5A-5D, collectively known as FIG. 5, display a logic flow diagram illustrating a routine 500 for acquiring additional server identification information for a known server 125 residing in a known domain 122 over a distributed network 119. A user may manually designate a computer for monitoring within the present invention. One skilled in the art, however, will recognize that input from a user may be acquired by means of a user interface (not shown) or other input devices. If a user wants to manually designate a computer, then the user must provide either a NetBIOS name or a FQDN. The user may also, optionally, provide domain 122 information to the server monitoring unit 104, if available. Using the NetBIOS name, FQDN, and/or the domain 122 information, the server monitoring unit 104 may retrieve the contact information necessary to robustly connect to the server 125 during periods of network 119 failure.

Routine 500 begins at 504 where the server monitoring unit 104 receives server name information (i.e., the NetBIOS name or the FQDN) and, optionally, domain 122 information from the user via a user interface. Next, at 507 the server monitoring unit 104 queries the specified server 125 for its corresponding domain 122 name, through an API provided by the network operating system unit 110. At 510, the server monitoring unit 104 then determines whether the server 125 queried was unreachable. If, at 510, the server monitoring unit 104 determines that the server 125 was unreachable, then the "YES" branch is followed to 513 where the server monitoring unit 104 ends operation and an appropriate error is generated.

If, however, at 510, the server monitoring unit 104 determines that the server 125 queried was reachable, the "NO" branch is followed to 516, in which the server monitoring unit 104 determines whether the user provided domain 122 information. If, at 516, the server monitoring unit 104 determines that the user did not provide domain 122 information, then the "NO" branch is followed to 528, described below.

However, if the server monitoring unit 104 determines, at 516, that the user did provide domain 122 information, then the "YES" branch is followed to 519, where the server monitoring unit 104 determines whether the domain name provided by the user is equivalent to the domain 122 name retrieved from the query of the specified server 125. If the server monitoring unit 104 determines, at 519, that the domain 122 name provided by the user is not the same as the domain 122 name retrieved from the query of the specified server 125, then the "NO" branch is followed to 522, where the server monitoring unit 104 designates the retrieved domain 122 name as the domain 122 name to be used and marks that the domain 122 information has not been validated. Marking domain 122 information as either validated or not validated may be accomplished by setting a flag or marking a logical bit within the data structure associated with the contact information stored in the potential server storage unit 107. The server monitoring unit 104 then proceeds to 528, described below. If, however, the server monitoring unit 104 determines, at 519, that the domain 122 name provided by the user is the same as the domain 122 name retrieved from the query of the specified server 125, then the "YES" branch is followed to 525 where the server monitoring unit 104 designates the domain 122 name specified by the user as the domain 122 name to be used and marks that the domain 122 information has not been validated. Routine 500 then proceeds to 528.

At 528, the server monitoring unit 104 determines whether the user provided a NetBIOS name or a FQDN. If the server monitoring unit 104 determines that the user did not provide a NetBIOS name or a FDQN, then the "NO" branch is followed to 531, where the server monitoring unit 104 halts operations and generates an error message indicating that a invalid server 125 name was specified. If at 528, however, the server monitoring unit 104 determines that the user did provide a NetBIOS name or a FQDN, then the "YES" branch is followed to 534, in which the server monitoring unit 104 uses the networking directory 116, via the network operating system unit 110, to search the designated domain 122 for the server 125 specified by the user. If the user entered a NetBIOS name, then the server monitoring unit 104 attempts to retrieve the FQDN. If the user entered a FQDN, then the server monitoring unit 104 attempts to retrieve the NetBIOS name.

Next, at 537, the server monitoring unit 104 determines whether the specified server 125 was found in the domain 122. If the server monitoring unit 104 determines, at 537, that the server 125 was found in the designated domain 122, then the "YES" branch is followed to 540 where the server monitoring unit 104 uses the validated NetBIOS name or FQDN (depending on which name the user provided) as contact information of the specified server 125. Next, the server monitoring unit 104 ends operation because the contact information was successfully retrieved. The server monitoring unit 104 then provides the contact information to the potential server storage unit 107 for storage.

If, however, at 537, the server monitoring unit 104 determines that the specified server 125 was not found in the designated domain 122, the "NO" branch is followed to 543, where the server monitoring unit 104 determines whether the domain 122 information was validated. If the server monitoring unit 104 determines, at 543, that the domain 122 information was validated, the "YES" branch is followed to 546 in which the server monitoring unit 104 returns an error, because the contact information of the specified server 125 could not be retrieved. On the other hand, if, at 543, the server monitoring unit 104 determines that the domain 122 information had not been validated, the "NO" branch is followed to 549, where the server monitoring unit 104 uses reverse DNS lookup to find the correct DNS name type.

Next, at 552, the server monitoring unit 104 determines whether the reverse DNS lookup provided a correct DNS name type. If the server monitoring unit 104 determines, at 552, that the reverse DNS lookup provided a correct DNS name type, then the "YES" branch is followed to 555 where the server monitoring unit 104 suspends operations because the contact information has been successfully retrieved. The server monitoring unit 104 provides the contact information to the potential server storage unit 107 for storage.

If, however, at 552, the server monitoring unit 104 determines that reverse DNS lookup did not provide a correct DNS name type, then the "NO" branch is followed to 558 where the server monitoring unit 104 determines whether it is looking for a NetBIOS name. This determination is made based upon the information provided by the user. If the NetBIOS name was provided by the user, then the server monitoring unit 104 is looking for the FQDN. If the FQDN was provided by the user, then the server monitoring unit 104 is looking for the NetBIOS name. If, the server monitoring unit 104 determines, at 558, that it is looking for the NetBIOS name, then the "YES" branch is followed to 564 where the server monitoring unit 104 uses the first label of the FQDN as the NetBIOS name. Routine 500 then proceeds to 555, where the server monitoring unit 104 ends operation since the contact information was successfully retrieved. The server monitoring unit 104 then provides the contact information to the potential server storage unit 107 for storage. Returning to 558, if the server monitoring unit 104 determines that it is not looking for the NetBIOS name, then the "NO" branch is followed to 561, in which the server monitoring unit 104 uses the NetBIOS name for the contact information. The server monitoring unit 104 then ends operation at 555 since the contact information was successfully retrieved. The server monitoring unit 104 provides the contact information to the potential server storage unit 107 for storage.

Figure 6A:
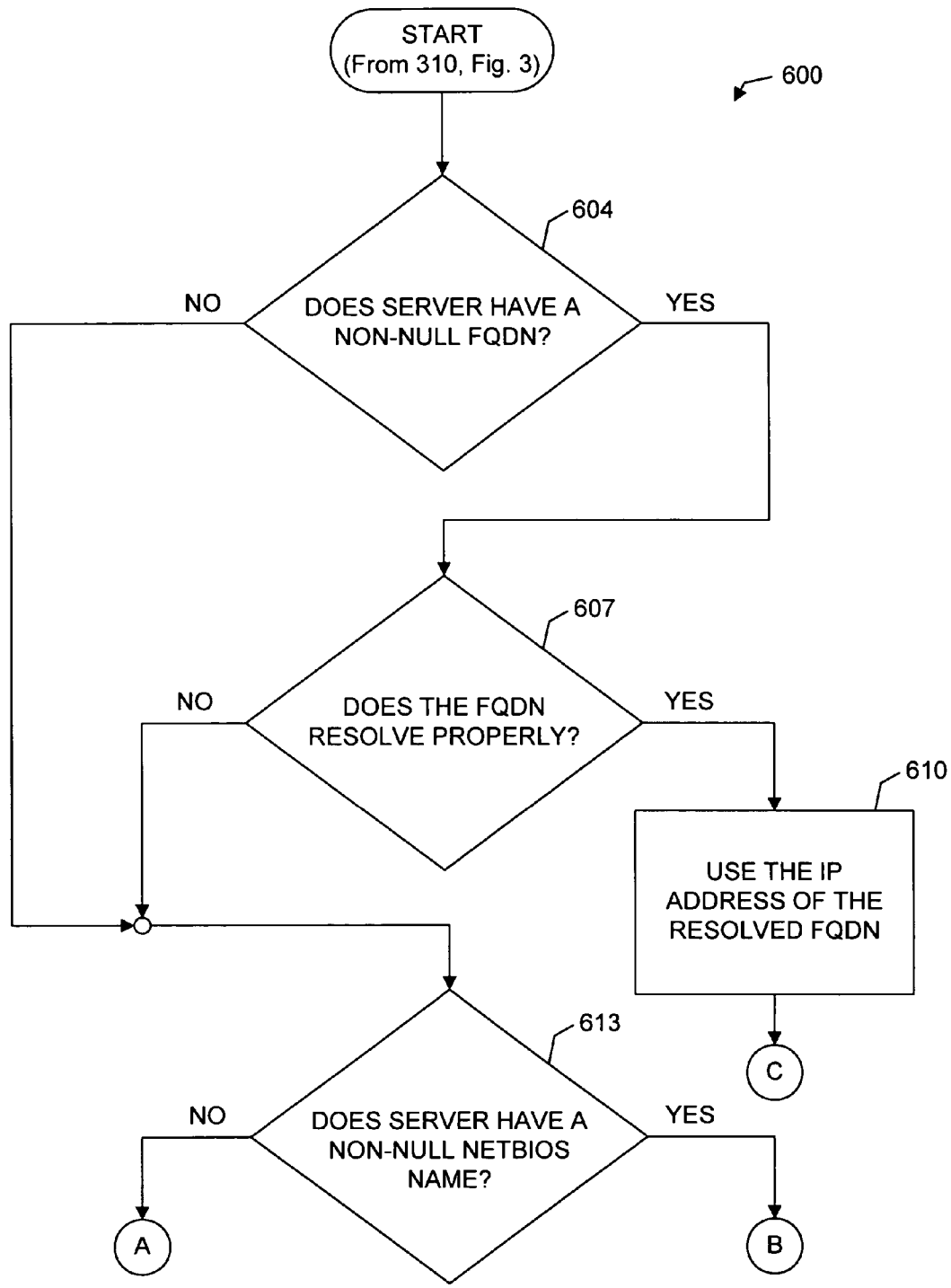
FIGS. 6A-6C, collectively known as FIG. 6, display a logic flow diagram illustrating a routine for storing contact information used to connect a client platform to a known server.
Figure 6B:
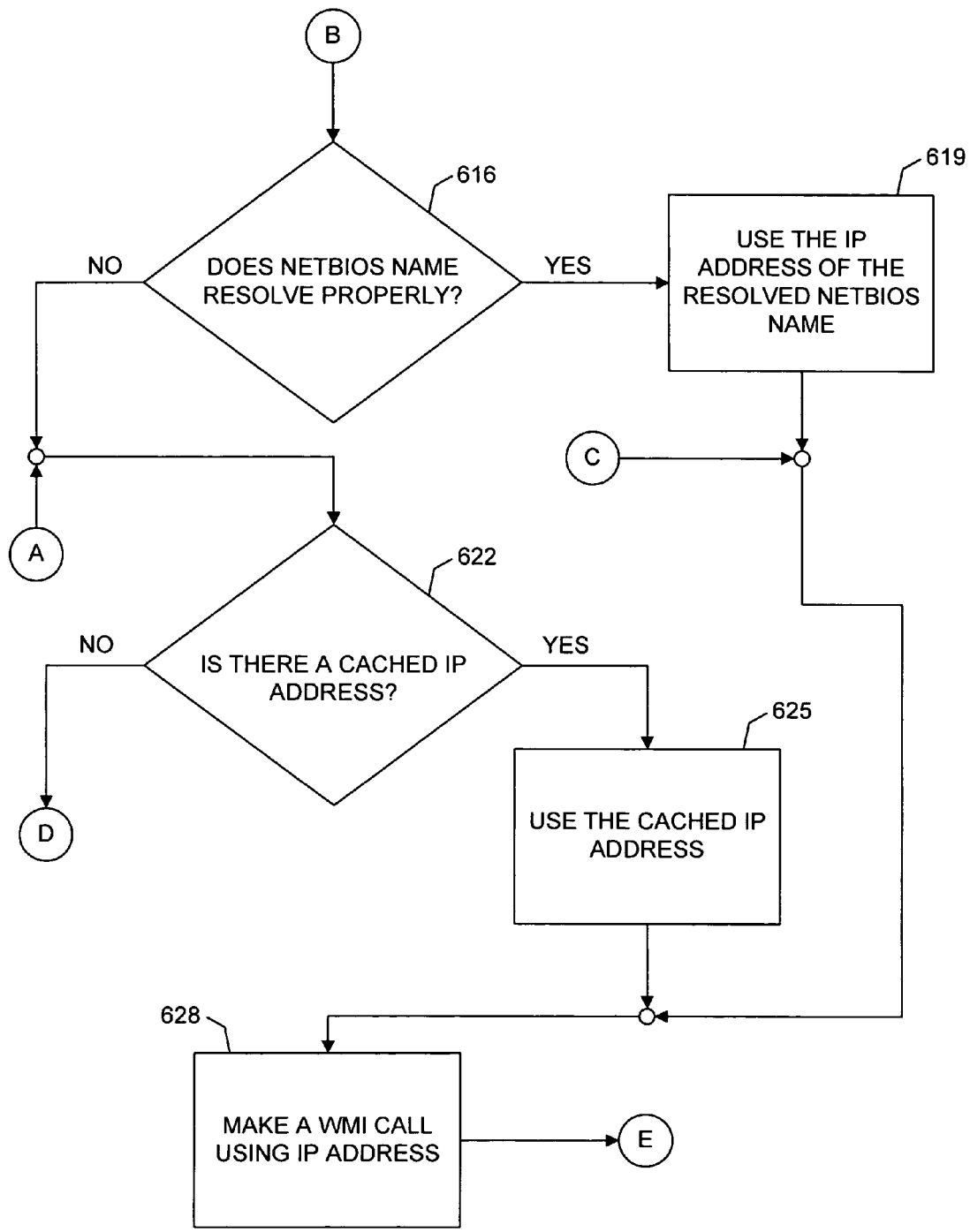
Figure 6C:
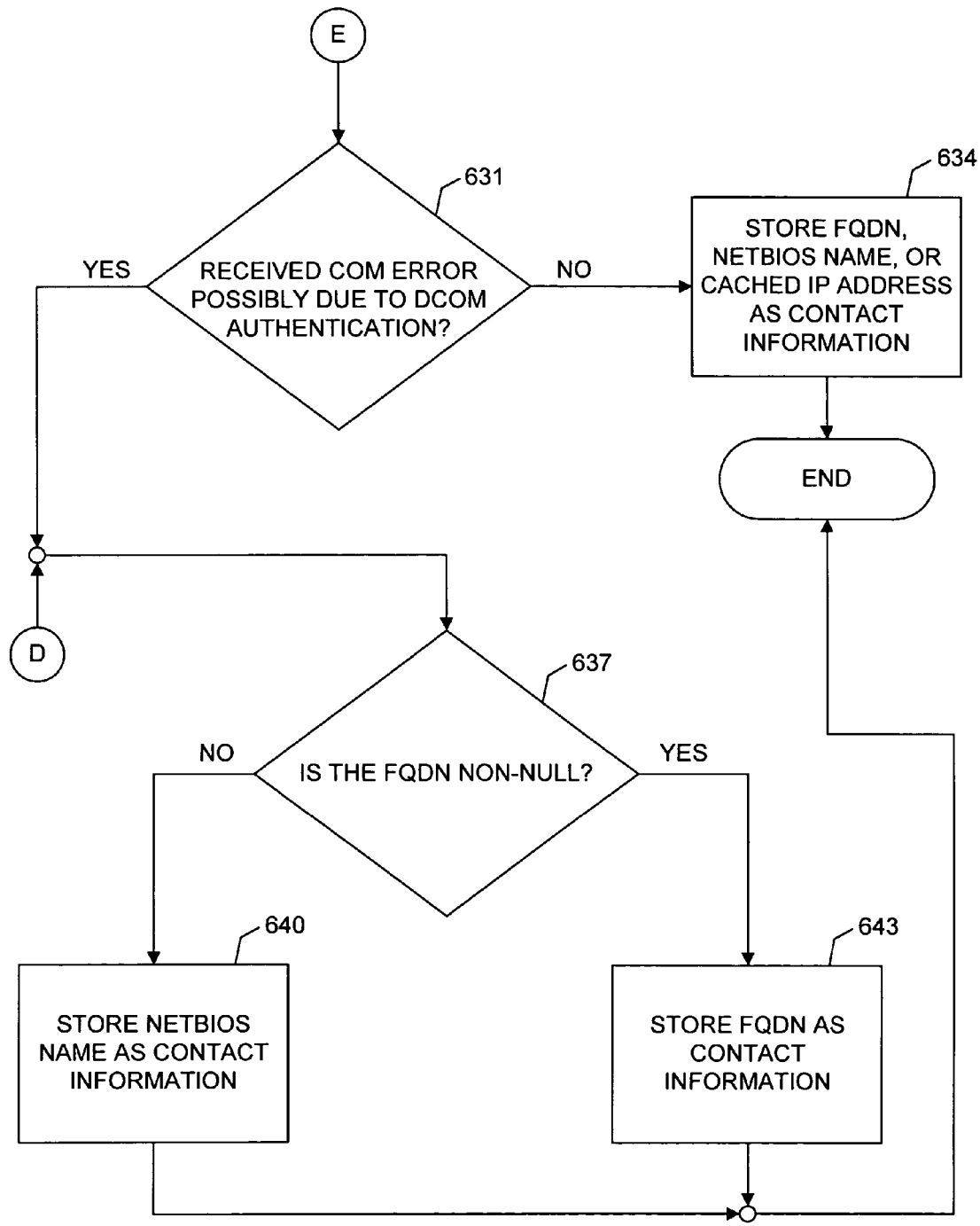

FIGS. 6A-6C, collectively known as FIG. 6, display a logic flow diagram illustrating a routine 600 from 310 (FIG. 3) for storing contact information used to connect a client platform to a known server 125. After the server monitoring unit 104 acquires the contact information of a server 125, the server monitoring unit 104 will have at its disposal the machine name (i.e., NetBIOS name), the FQDN, the domain 122 of the server 125, and the last known valid IP address of the server 125. After storing the contact information, the server monitoring unit 104 will have multiple, redundant ways for connecting to the server 125 during periods where the network 119 is not behaving properly. Connecting to the server 125 allows the server monitoring unit 104 to monitor the server 125 and determine whether the server 125 is working properly.

Routine 600 begins at 604, in which the server monitoring unit 104 determines whether the server 125 has a non-null FQDN. Depending on the server 125, the server 125 may or may not have a FQDN. Typically, servers 125 only have a FQDN on DNS-enabled networks 119. If the server monitoring unit 104 determines, at 604, that the server 125 has a null FQDN, then the "NO" branch is followed to 613, described below. If the server monitoring unit 104 determines, at 604, that the server 125 has a non-null FQDN, then the "YES" branch is followed to 607, in which the server monitoring unit 104 determines whether the FQDN properly resolves. The server monitoring unit 104, through the network operating system unit 110, uses the DNS server to resolve the FQDN. The result, generally, is the appropriate IP address for the server 125 associated with the FQDN. If, the FQDN did not properly resolve, then the "NO" branch is followed to 613, which is described below.

If, however, the server monitoring unit 104 determines, at 607, that the FQDN resolves properly, then the "YES" branch is followed to 610 where the server monitoring unit 104 designates the IP address, acquired from resolving the FQDN, as the IP addressed to be used for connecting to the server 125. Routine 600 then proceeds to 628, described below.

At 613, the server monitoring unit 104 determines whether the server 125 has a non-null NetBIOS name. If the determination is made that the server 125 has a null NetBIOS name, then the "NO" branch is followed to 622, which is described in detail below. Otherwise, the "YES" branch is followed to 616 where the server monitoring unit 104 determines whether the NetBIOS name properly resolves. The server monitoring unit 104, through the network operating system unit 110, uses the NetBIOS server to resolve the server's 125 NetBIOS name. The result, generally, is the appropriate IP address for the server 125 associated with the NetBIOS name. If, the server monitoring unit 104 determines, at 616, that the NetBIOS name does not resolve properly, then the "NO" branch is followed to 622, which is further described below. If, however, the server monitoring unit 104 determines, at 616, that the NetBIOS name does resolve properly, then the "YES" branch is followed to 619, where the server monitoring unit 104 designates the IP address, acquired from resolving the NetBIOS, to be used for connecting to the server 125. Routine 600 then proceeds to 628, further described below.

At 622, the server monitoring unit 104 determines whether there is an IP address for the server 125 stored in a cached storage unit. The cached IP address is the IP address last used to successfully connect to the server 125 and the last IP address successfully resolved from the NetBIOS or FDQN. If the server monitoring unit 104 determines, at 622, that there is no cached IIP address, then the "NO" branch is followed to 637, which is described in detail below. If the server monitoring unit 104 determines, at 622, that there is a cached IP address, then the "YES" branch is followed to 625 where the server monitoring unit 104 designates the IP address acquired from a cache memory storage unit as the IP address to be used for connecting to the server 125.

At 628, the server monitoring unit 104 makes an administrative network call, through the network operating system unit 110, to the server 125 using the designated IP address. Such an administrative network call may be conducted through an API similar to "WINDOWS® MANAGEMENT INSTRUMENTATION" (WMI) available from Microsoft Corporation of Redmond, Wash. Next, at 631, the server monitoring unit 104 determines whether it received a component object model (COM) error, possibly due to a distributed component object model (DCOM) authentication error. One skilled in the art will recognize that DCOM uses the remote procedure call (RPC) protocol to communicate data between COM components, such as clients and servers 125 on a network 119, and that different object-oriented models of communicating between network devices may be used with the present invention. If, at 631, the server monitoring unit 104 determines that no COM error was received, then the "NO" branch is followed to 634 where the server monitoring unit 104 stores the FQDN, NetBIOS name, or cached IP address as contact information in the potential server storage unit 107 and stops operations because the server monitoring unit 104 has successfully connected to the server 125. If, however, at 631, the server monitoring unit 104 determines that a COM error was received, then the "YES" branch is followed to 637, in which the server monitoring unit 104 determines whether the FQDN for the server 125 is a non-null value. If, at 637, the server monitoring unit 104 determines that the FQDN is a non-null value, then the "YES" branch is followed to 643, where the server monitoring unit 104 stores the FQDN as contact information in the potential server storage unit 107. Otherwise, the "NO" branch is followed to 640, where the server monitoring unit 104 stores the NetBIOS as contact information in the potential server storage unit 107. The contact information may then be used to connect to the server 125.

Figure 7:
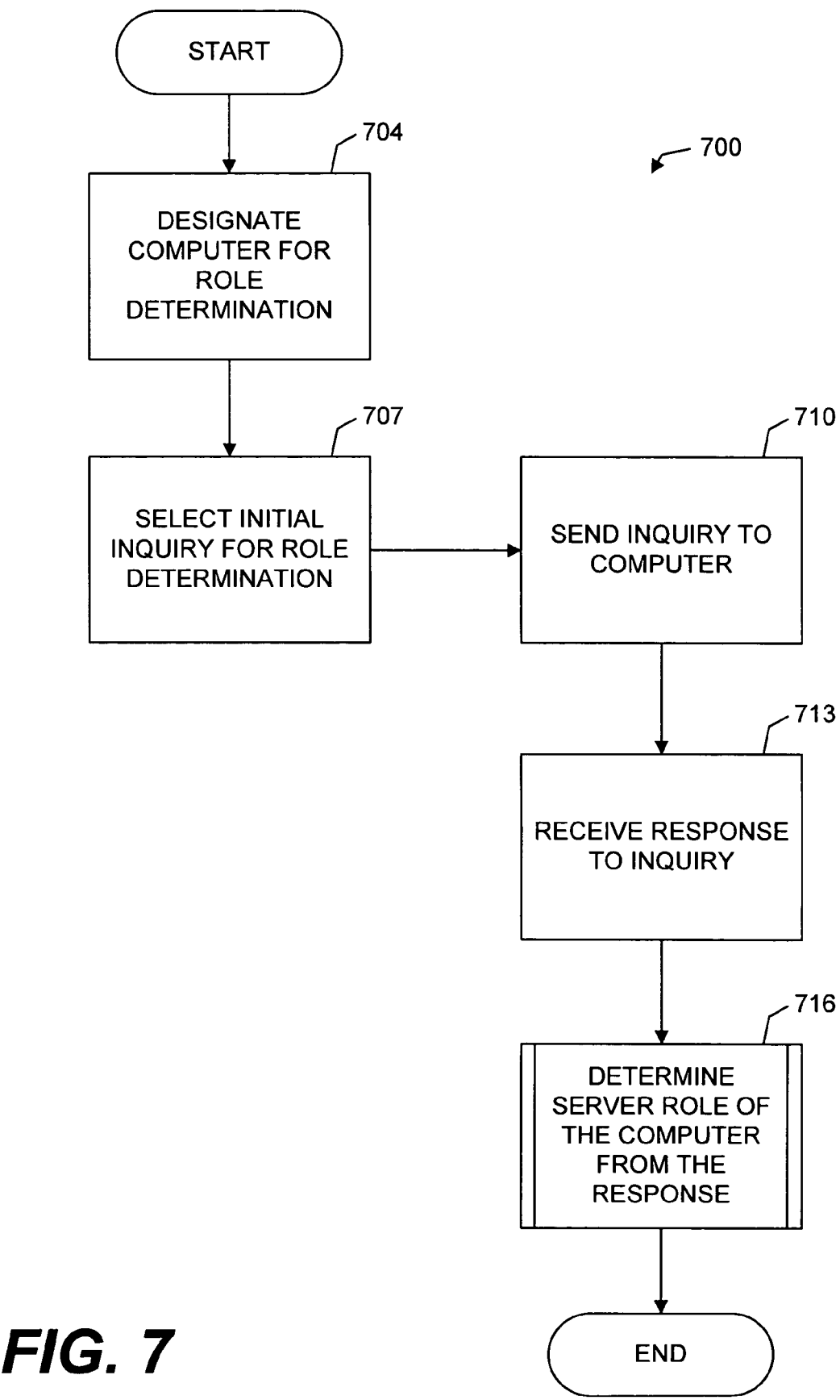
FIG. 7 displays a logic flow diagram illustrating a routine for determining the role of a server through appropriate inquiry data.

FIG. 7 displays a logic flow diagram illustrating a routine 700 for determining the role of a server 125 through appropriate inquiry data. To successfully classify the role of a server 125, or more generically to successfully classify the role of a computer (i.e., potential server), the server monitoring unit 104 sends multiple queries to the computer and, based on the responses received from the computer, the server monitoring unit 104 may determine the role of the computer within the network 119 and, further, the role of a server 125. The queries may include subsets or stages of queries required to adequately determine what exactly the computer does within the network 119.

Routine 700 begins at 704, in which the server monitoring unit 104 designates a computer for role determination. The server monitoring unit 104 may determine which computers should be designated for role determination based on the potential server data stored in the potential server storage unit 107. A designated computer may or may not be a server 125 within the network 119. Through server role inquiries, however, the service monitoring unit 104 may determine whether the designated computer is a server 125. Through the designated computer's responses to the server role inquiries, the server monitoring unit 104 may determine that the designated computer is not a server 125. Additionally, the server monitoring unit 104 uses server role inquiries to determine the role of a server 125. The role of a server 125 is defined by the functionality and services provided by the server 125 within the network 119. After server discovery has been completed (see FIG. 5), the potential server storage unit 107 contains data and contact information with reference to each computer/server found on the network. When additional information is needed, such as determining the role of the server 125, the server monitoring unit 104 must designate each server 125 it wishes to query for server role determination.

Next, at 707, the server monitoring unit 104 creates an initial inquiry for server role determination. The server monitoring unit 104 receives inquiry data from the role inquiry storage unit 113. The procession of inquiry for server role determination may be hierarchical and, therefore, may require multiple layers of inquiry before a server's 125 role may be determined. Based upon the responses received by the server monitoring unit 104, additional inquiries may be necessary to further define the role of the server 125 or determine if the designated computer is a server 125.

At 710, the server monitoring unit 104 sends the initial inquiry for server role determination to the designated computer. In an exemplary embodiment of the present invention, inquiries for server role determination may be made through objects or APIs, also known as "sniffers", which collect information about a designated computer. Each sniffer may use different inquiries for different server types to obtain data from the designated server 125. The server monitoring unit 104 may send a request in extensible markup language (XML) to the sniffer, indicating what information to obtain and, if necessary, indicating how to interpret the received information from the designated computer.

Next, at 713, the server monitoring unit 104 receives a response to the inquiry from the designated computer. Upon receiving a response to the inquiry, the server monitoring unit 104, at 716, determines whether the designated computer is a server 125 and, if the designated computer is a server 125, the server role of the designated computer. The server monitoring unit 104 determines the server role based on the data provided in the response to the inquiry. It may be necessary for the server monitoring unit 104 to send additional inquiries until enough data has been collected through responses from the designated computer (i.e., repeating 710, 713, and 716). Once the server monitoring unit 104 determines the server role (or lack thereof) of the designated computer, the determined role data may be stored in the potential server storage unit 107.

Figure 8:
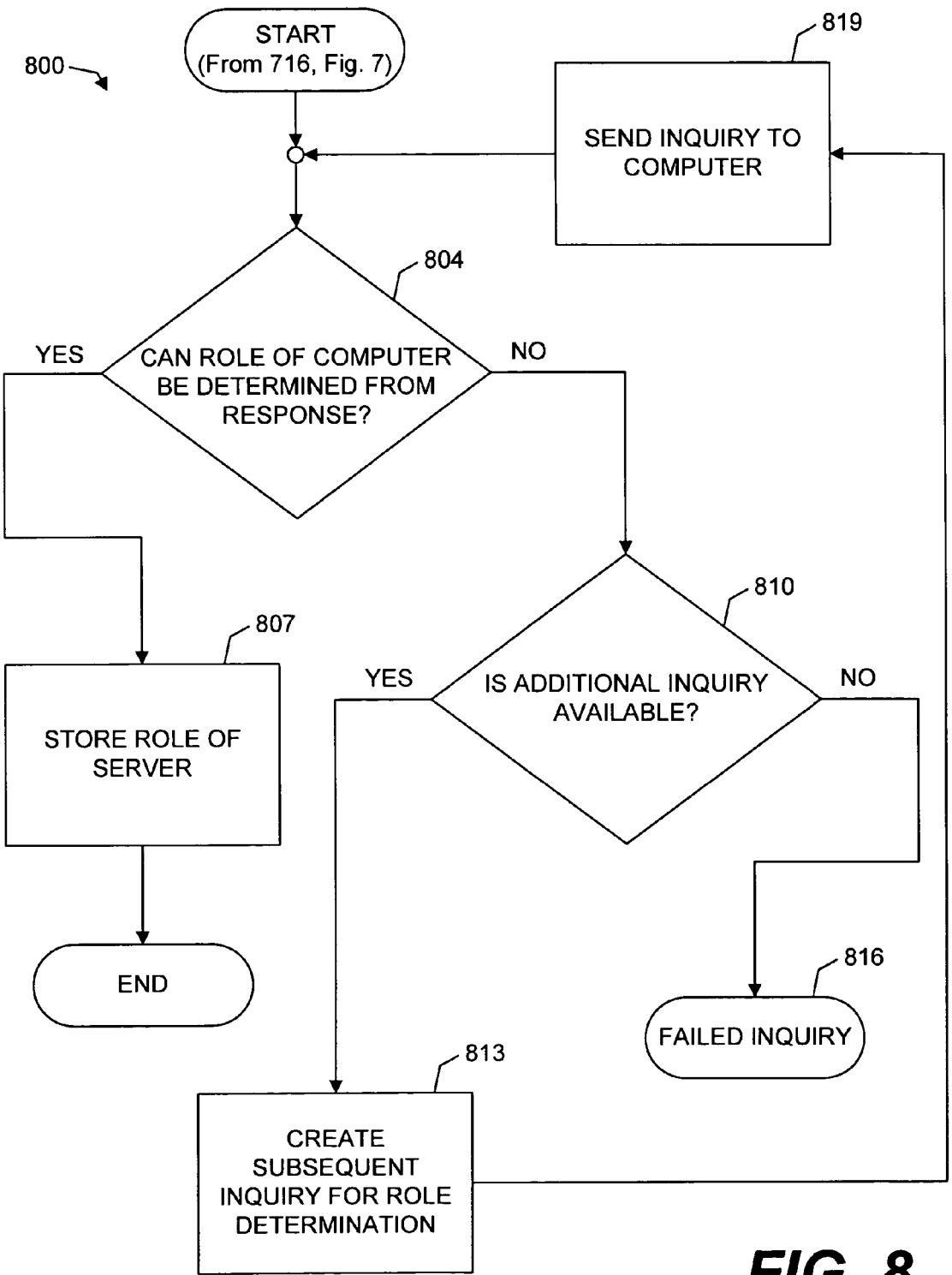
FIG. 8 displays a logic flow diagram illustrating a routine for determining the role of a server based on a response received from a server.

FIG. 8 displays a logic flow diagram illustrating a routine 800 from 716 (FIG. 7) for determining the role of a server 125 based on a response received from a server 125. The server monitoring unit 104 determines the server role of a designated computer from the computer's response to an inquiry provided by the server monitoring unit 104. Routine 800 illustrates how the server role of a designated computer is determined. After sending an inquiry to a designated computer and receiving a response to the inquiry from the designated computer, routine 800 begins at 804 where the server monitoring unit 104 determines whether the server role of the designated computer can be determined based on the received response.

If, the server monitoring unit 104 determines, at 804, that the server role of the designated computer can be determined from the received response, then the "YES" branch is followed to 807 where the server monitoring unit 104 stores the server role of the server in the potential server storage unit 107 and halts operation because the server role determination of the computer was successful. On the other hand, if at 804, the server monitoring unit 104 determines that the server role of the designated computer cannot be determined based on the received response, then the "NO" branch is followed to 810, where the server monitoring unit 104 determines whether an additional inquiry is available. The server monitoring unit 104 evaluates whether any additional inquiry is available, based on a series of factors. Specifically, the server monitoring unit's 104 evaluation is based on a predetermined inquiry scheme. The server monitoring unit 104 determines whether a subsequent inquiry exists within the role inquiry storage unit 113. If, at 810, the server monitoring unit 104 determines that an additional inquiry does not exist, then the "NO" branch is followed to 816 where the routine 800 stops because the server role of the designated computer cannot be determined by inquiry. Generally, the server role of the designated computer cannot be determined if the designated computer is not a server 125 or the designated computer is not functioning properly as a server 125. However, if, at 810, the server monitoring unit 104 determines that an additional inquiry exists, then the "YES" branch is followed to 813, where the server monitoring unit 104 creates a subsequent inquiry for server role determination from inquiry data within the role inquiry storage unit 113. Then, at 819, the server monitoring unit 104 sends the subsequent inquiry to the designated computer. The server monitoring unit 104 then proceeds to 804, where the routine 800 is repeated as necessary until the server monitoring unit 104 determines whether the server role of the computer can be determined or whether it cannot be determined.

Whereas the present invention has been described in detail it is understood that variations and modifications can be effected within the spirit and scope of the invention, as described herein before and as defined in the appended claims. The corresponding structures, materials, acts, and equivalents of all means-plus-function elements, if any, in the claims below are intended to include any structure, material or acts for performing the functions in combination with other claimed elements as specifically claimed.

What is claimed is:

1. A system for discovering and identifying a server, the system comprising:
   a network comprising at least one domain, the at least one domain comprising a plurality of servers; and
   a communication device comprising:
      a server monitoring unit operable for:
         dynamically discovering a server on the network;
         monitoring the server on the network;
         determining information associated with the monitored server, wherein the information is used to connect to the monitored server after a network failure situation;
         determining if additional information associated with the monitored server is required, the additional information including data necessary to robustly connect to the monitored server or to identify the monitored server's type;
         requesting the additional information from the monitored server; and
         determining the monitored server's role based on the additional information received from the monitored server; and
      a potential server storage unit operable for storing the information associated with the monitored server.

2. The system of claim 1, wherein the communication device further comprises:
   a role inquiry storage unit adapted to store role inquiry data used to determine the role of the monitored server, wherein the role inquiry data comprises information inquiries pertaining to identification of a plurality of server types.

3. The system of claim 2, wherein the potential server storage unit is further operable for receiving and storing potential server data used to identify potential servers, wherein the potential server data is received from a networking directory or from the potential server's response to the role inquiry data.

4. The system of claim 3, wherein the server monitoring unit is further operable for:
   communicating with the network, the role inquiry storage unit, and the potential server storage unit,
   wherein the server monitoring unit is operable for receiving the potential server data from the potential server storage unit;
   determining whether the potential server data requires additional information from a potential server,
   wherein the additional information comprises information to robustly connect to the potential server or to identify the server type of the potential server;
   receiving role inquiry data from the role inquiry storage unit;
   providing role inquiry data to the potential server;
   receiving additional information from the potential sever;
   determining the potential server's role from the additional information; and
   providing the additional information from the potential server to the potential server storage unit.

5. The system of claim 4, the server monitoring unit further adapted to receive networking data from the networking directory and provide the networking data to the potential server storage unit as potential sever data, wherein networking data comprises information necessary to robustly connect to the potential server or information necessary to identify the potential server's role.

6. The system of claim 1, the system further comprising:
   a network operating system unit adapted to communicate with the network and the sever monitoring unit,
   wherein the network operating system unit is adapted for:
      receiving the potential sever data and the role inquiry data from the sever monitoring unit;
      providing the potential server data and the role inquiry data to the potential server;
      receiving the additional information from the potential server; and
      providing the additional information to the server monitoring unit.

7. A method for discovering a server in a network and contacting the server in a network failure situation, the method comprising:
   dynamically discovering a server on a network;
   receiving a name of the server on the network, the name being selected from a list comprising a NetBIOS name and a FQDN;
   filling in contact information associated with the server, the filling in contact information associated with the server including processing the name of the server on the network, the processing comprising:
(a) locating the server in a predetermined domain and
(b) storing the name of the sever as the contact information necessary for connecting to the server;
determining whether the network is functioning properly; and
connecting to the server, if the network is not functioning properly.

8. The method of claim 7, wherein determining whether the network is functioning properly comprises:
determining whether a domain name service (DNS) server is available by attempting to resolve a fully qualified domain name (FQDN) associated with the server; and
determining whether network basic input/output system (NetBIOS) traffic exists by attempting to resolve a NetBIOS name associated with the server,
wherein the network is functioning properly if the FQDN and the NetBIOS name resolve.

9. The method of claim 7, wherein dynamically discovering a server comprises:
generating a first list of enumerated domains through domain trust discovery;
generating a second list of enumerated domains through directory partitions discovery;
determining whether at least one domain was found in the first list of enumerated domains or the second list of enumerated domains; and
generating a third list of enumerated domains through networking discovery, if no domain was found in the first list of enumerated domains or the second list of enumerated domains.

10. The method of claim 9, wherein dynamically discovering a server further comprises:
generating a first list of enumerated servers through directory object discovery for each enumerated domain;
determining whether an error occurred during the directory object discovery;
performing a first sequence if an error did not occur during the directory object discovery, the first sequence comprising:
determining whether a server was found in the first list of servers; and
generating a second list of enumerated servers through networking discovery, if no server was found in the first list of servers; and
performing a second sequence if an error occurred during the directory object discovery, the second sequence comprising:
generating a second list of enumerated servers through networking discovery.

11. The method of claim 7, wherein filling in contact information associated with the server further comprises:
receiving a server name from a user;
receiving a first domain name from the user, if the user provides the first domain name;
querying a server associated with the server name for a second domain name, wherein the server belongs to a domain identified by the second domain name;
determining whether the user provided the first domain name;
verifying the first domain name, if it is determined that the first domain name was provided by the user;
determining whether the user provided a server identifier name; and
processing the server identifier name, if the server identifier name was provided by the user.

12. The method of claim 11, wherein the method further comprises:
determining whether an error occurred when querying the server identified by the server name for a second domain name; and
terminating operation of the method if the determination is made that an error occurred.

13. The method of claim 11, wherein the server identifier name is selected from a list comprising a NetBIOS name and a FQDN.

14. The method of claim 13, wherein verifying the first domain name comprises:
determining whether the first domain name is the same as the second domain name;
using the second domain name as a designated domain name if it is determined that the first domain name and the second domain name are not the same;
using the first domain name as a designated domain name if it is determined that the first domain name and the second domain name are the same; and
marking a flag that identifies the designated domain name as not validated.

15. The method of claim 14, wherein processing the NetBIOS name or FQDN comprises:
using a network directory to search for a server identified by the NetBIOS name or the FQDN within a predetermined domain;
determining whether the sever identified by the NetBIOS name or FQDN was found in the predetermined domain;
performing a first sequence if the server identified by the NetBIOS name or FQDN was not found in the predetermined domain, the first sequence comprising:
determining whether the designated domain name is validated; and
validating the designated domain name, if it is determined that the designated domain name was not validated; and
performing a second sequence if the server identified by the NetBIOS name or FQDN was found in the predetermined domain, the second sequence comprising:
storing the NetBIOS name as contact information, if the server was identified by the NetBIOS name; and
storing the FQDN as contact information, if the server was identified by the FQDN.

16. The method of claim 15, wherein validating the designated domain name comprises:
using DNS reverse lookup to find a correct name type;
determining whether DNS reverse lookup found the correct name type;
performing a third sequence if DNS reverse lookup did not find the correct name type, the third sequence comprising:
designating the NetBIOS name as contact information, if the user provided the NetBIOS name; and
designating a first label of the FQDN as contact information, if the user did not provide the NetBIOS name.

17. The method of claim 7, wherein storing the contact information necessary for connecting to the at least one server comprises:
determining a valid internet protocol (IP) address for connecting to the server;
sending an administrative network call to the server using the valid IP address;
determining whether an error occurred when sending the administrative network call to the server;

performing a first sequence if an error did not occur when sending the administrative network call to the server, the first sequence comprising:
  storing the valid IP address as contact information; and
performing a second sequence if an error did occur when sending the administrative network call to the server, the second sequence comprising:
  determining whether a FQDN associated with the server is valid;
  storing a NetBIOS name associated with the server, if the FQDN is not valid; and
  storing the FQDN associated with the server, if the FQDN is valid.

18. The method of claim 17, wherein determining whether a FQDN associated with the server is valid comprises determining whether the FQDN is non-null FQDN.

19. The method of claim 17, wherein determining a valid IP address comprises:
  determining whether the server has a non-null FQDN;
  determining whether the FQDN resolves properly, if the server has a non-null FQDN; and
  designating an IP address retrieved from resolving the FQDN as the valid IP address, if the FQDN resolves properly.

20. The method of claim 19, wherein determining a valid IP address further comprises:
  determining whether the server has a non-null NetBIOS name;
  determining whether the NetBIOS name resolves properly, if the server has a non-null NetBIOS name; and
  designating an IP address retrieved from resolving the NetBIOS name as the valid IP address, if the NetBIOS name resolves properly.

21. The method of claim 20, wherein determining a valid EP address further comprises:
  determining if there is a cached IP address associated with the server; and
  designating the cached IP address as the valid IP address, if the cached EP address associated with the server exists.

22. A method for identifying a server in a network, the method comprising:
  designating a remote computer for determining a server role for the remote computer the server role being defined by a functionality of the server, the server role being used to contact the server in a network failure situation, the server role including a printer server;
  selecting a role inquiry from a set of role inquiries, the set of role inquiries comprising requests to determine the server role and requests to monitor the server after the server role has been determined, wherein if the server role has been determined as the printer server, the requests to monitor the server include printer ports information and spool directory information;
  querying the remote computer with the role inquiry;
  receiving a response to the role inquiry from the remote computer;
  attempting to determine a server role of the remote computer from the response; and
  storing the determined server role.

23. The method of claim 22, wherein the method further comprises:
  selecting a second role inquiry from a set of role inquiries, if the server role of the remote computer cannot be determined;
  querying the remote computer with the second role inquiry;
  receiving a second response to the second role inquiry from the remote computer; and
  determining server role of the remote computer from the second response.

24. The method of claim 22, wherein the attempt to determine a server role of the remote computer from the response is successful.

25. A computer-readable storage medium having computer-executable instructions for discovering a server in a network stored thereon, the computer-executable instructions performing steps comprising:
  dynamically discovering a server on a network;
  receiving a name of the server on the network, the name being selected from a list comprising a NetBIOS name and a FQDN;
  filling in contact information associated with the server, the filling in contact information associated with the server including processing the name of the server on the network, the filling in contact information being used to connect to the server after a network failure situation, the processing the name of the server on the network comprising:
    (a) locating the server in a predetermined domain; and
    (b) storing the name of the server as the contact information necessary for connecting to the server;
  determining whether the network is functioning properly; and
  connecting to the server, if the network is not functioning properly.

26. The computer-readable storage medium of claim 25, wherein determining whether the network is functioning properly comprises:
  determining whether a DNS server is available by attempting to resolve a FQDN associated with the at least one server; and
  determining whether NetBIOS traffic exists by attempting to resolve a NetBIOS name associated with the at least one server,
  wherein the network is functioning properly if the FQDN and the NetBIOS name resolve.

27. The computer-readable storage medium of claim 25, wherein dynamically discovering a server comprises:
  generating a first list of enumerated domains through domain trust discovery;
  generating a second list of enumerated domains through directory partitions discovery;
  determining whether at least one domain was found in the first list of enumerated domains or the second list of enumerated domains; and
  generating a third list of enumerated domains through networking discovery, if no domain was found in the first list of enumerated domains or the second list of enumerated domains.

28. The computer-readable storage medium of claim 27, wherein dynamically discovering a server further comprises:
  generating a first list of enumerated servers through directory object discovery for each enumerated domain;
  determining whether an error occurred during the directory object discovery;
  performing a first sequence if an error did not occur during the directory object discovery, the first sequence comprising:
    determining whether a server was found in the first list of servers; and
    generating a second list of enumerated servers through networking discovery, if no server was found in the first list of servers; and performing a second sequence if an error occurred during the directory object discovery, the second sequence comprising:
    generating a second list of enumerated servers through networking discovery.

29. The computer-readable storage medium of claim 25, wherein filling in contact information associated with the server comprises:
    receiving a server name from a user;
    receiving a first domain name from the user, if the user provides the first domain name;
    querying a server associated with the server name for a second domain name, wherein the server belongs to a domain identified by the second domain name;
    determining whether the user provided the first domain name;
    verifying the first domain name, if it is determined that the first domain name was provided by the user;
    determining whether the user provided a server identifier name; and
    processing the server identifier name, if the server identifier name was provided by the user.

30. The computer-readable storage medium of claim 29, having further computer-executable instructions for performing the steps of:
    determining whether an error occurred when querying the server identified by the server name for a second domain name; and
    terminating operation of the method if the determination is made that an error occurred.

31. The computer-readable storage medium of claim 29, wherein the server identifier name is selected from a list comprising a NetBIOS name and a FQDN.

32. The computer-readable storage medium of claim 31, wherein verifying the first domain name comprises:
    determining whether the first domain name is the same as the second domain name;
    using the second domain name as a designated domain name if it is determined that the first domain name and the second domain name are not the same;
    using the first domain name as a designated domain name if it is determined that the first domain name and the second domain name are the same; and
    marking a flag that identifies the designated domain name as not validated.

33. The computer-readable storage medium of claim 32, wherein processing the NetBIOS name or FQDN comprises:
    using a network directory to search for a server identified by the NetBIOS name or the FQDN within a predetermined domain;
    determining whether the server identified by the NetBIOS name or FQDN was found in the predetermined domain;
    performing a first sequence if the server identified by the NetBIOS name or FQDN was not found in the predetermined domain, the first sequence comprising:
        determining whether the designated domain name is validated; and
        validating the designated domain name, if it is determined that the designated domain name was not validated; and
    performing a second sequence if the server identified by the NetBIOS name or FQDN was found in the predetermined domain, the second sequence comprising:
        storing the NetBIOS name as contact information, if the server was identified by the NetBIOS name; and
        storing the FQDN as contact information, if the server was identified by the FQDN.

34. The computer-readable storage medium of claim 33, wherein validating the designated domain name comprises:
    using DNS reverse lookup to find a correct name type;
    determining whether DNS reverse lookup found the correct name type;
    performing a third sequence if DNS reverse lookup did not find the correct name type, the third sequence comprising:
        designating the NetBIOS name as contact information, if the user provided the NetBIOS name; and
        designating a first label of the FQDN as contact information, if the user did not provide the NetBIOS name.

35. The computer-readable storage medium of claim 25, wherein storing the contact information necessary for connecting to the server comprises:
    determining a valid internet protocol (IP) address for connecting to the server;
    sending an administrative network call to the server using the valid IP address;
    determining whether an error occurred when sending the administrative network call to the server;
    performing a first sequence if an error did not occur when sending the administrative network call to the server, the first sequence comprising:
        storing the valid IP address as contact information; and
    performing a second sequence if an error did occur when sending the administrative network call to the server, the second sequence comprising:
        determining whether a FQDN associated with the server is valid;
        storing a NetBIOS name associated with the server, if the FQDN is not valid; and
        storing the FQDN associated with the server, if the FQDN is valid.

36. The computer-readable storage medium of claim 35, wherein determining whether a FQDN associated with the server is valid comprises determining whether the FQDN is non-null FQDN.

37. The computer-readable storage medium of claim 35, wherein determining a valid IP address comprises:
    determining whether the server has a non-null FQDN;
    determining whether the FQDN resolves properly, if the sewer has a non-null FQDN; and
    designating an LP address retrieved from resolving the FQDN as the valid IP address, if the FQDN resolves properly.

38. The computer-readable storage medium of claim 37, wherein determining a valid EP address further comprises:
    determining whether the server has a non-null NetBIOS name;
    determining whether the NetBIOS name resolves properly, if the server has a non-null NetBIOS name; and
    designating an IP address retrieved from resolving the NetBIOS name as the valid IP address, if the NetBIOS name resolves properly.

39. The computer-readable storage medium of claim 38, wherein determining a valid IP address further comprises:
    determining if there is a cached IP address associated with the server; and
    designating the cached IP address as the valid IP address, if the cached IP address associated with the server exists.

40. A computer-readable storage medium having computer-executable instructions for identifying a server in a network stored thereon, the computer-executable instructions performing steps comprising:

designating a remote computer for determining a server role for the remote computer the server role being defined by a functionality of the server, the server role including a printer server;

selecting a role inquiry from a set of role inquiries, the set of role inquiries comprising requests to determine the server role and requests to monitor the server after the server role has been determined, wherein if the server role has been determined as the printer server, the requests to monitor the server include printer ports information and spool directory information;

querying the remote computer with the role inquiry;

receiving a response to the role inquiry from the remote computer;

attempting to determine a server role of the remote computer from the response and storing the determined server role.

41. The computer-readable storage medium of claim 40, wherein the method further comprises:

selecting a second role inquiry from a set of role inquiries, if the server role of the remote computer cannot be determined;

querying the remote computer with the second role inquiry;

receiving a second response to the second role inquiry from the remote computer; and determining server role of the remote computer from the second response.

42. The computer-readable storage medium of claim 40, wherein the attempt to determine a server role of the remote computer from the response is successful.

* * * * *